(12) United States Patent
Zhang et al.

(10) Patent No.: US 11,930,173 B2
(45) Date of Patent: Mar. 12, 2024

(54) TRANSFORM PARAMETER DERIVATION BASED ON BLOCK PARTITION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 91 days.

(21) Appl. No.: 17/401,479

(22) Filed: Aug. 13, 2021

(65) Prior Publication Data

US 2021/0377531 A1 Dec. 2, 2021

Related U.S. Application Data

(63) Continuation of application No. PCT/CN2020/075562, filed on Feb. 17, 2020.

(30) Foreign Application Priority Data

Feb. 15, 2019 (WO) ................ PCT/CN2019/075170

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/46* (2014.11); *H04N 19/96* (2014.11)

(58) Field of Classification Search
None
See application file for complete search history.

(56) References Cited

U.S. PATENT DOCUMENTS 9,131,245 B2 9/2015 Chen et al.
10,154,258 B2 12/2018 He et al.
(Continued)

FOREIGN PATENT DOCUMENTS

CN 102843556 A 12/2012
CN 108464001 A 8/2018
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

(Continued)

*Primary Examiner* — Kaitlin A Retallick
(74) *Attorney, Agent, or Firm* — Perkins Coie LLP

(57) ABSTRACT

Transform parameter derivation based on block partition is described. In an exemplary aspect, a method for video processing includes determining, for a conversion between a first block of video and a bitstream representation of the first block of video, whether a use of non-power-of-two partition trees (NPT-T) is enabled or disabled, wherein the NPT-T includes splitting the first block to multiple smaller sized child blocks of the first block, and at least one child block's width and/or height have a dimension that is a non-power-of-two integer; and performing the conversion based on the NPT-T in response to the determination that the NPT-T is enabled.

20 Claims, 30 Drawing Sheets

(51) Int. Cl.
*H04N 19/46* (2014.01)
*H04N 19/96* (2014.01)

(56) References Cited

U.S. PATENT DOCUMENTS

| | | | |
|---|---|---|---|
| 10,368,072 | B2 | 7/2019 | Zhang et al. |
| 10,469,904 | B2 | 11/2019 | He et al. |
| 10,536,707 | B2 | 1/2020 | He et al. |
| 2006/0251121 | A1 | 11/2006 | Vacanti |
| 2008/0136974 | A1 | 6/2008 | Yuan et al. |
| 2013/0163664 | A1 | 6/2013 | Guo et al. |
| 2017/0208336 | A1 | 7/2017 | Li et al. |
| 2018/0109812 | A1 | 4/2018 | Tsai et al. |
| 2018/0199062 | A1 | 7/2018 | Zhang et al. |
| 2018/0199072 | A1 | 7/2018 | Li et al. |
| 2018/0367814 | A1 | 12/2018 | Seregin et al. |
| 2019/0273931 | A1 | 9/2019 | Lim et al. |
| 2019/0335172 | A1 | 10/2019 | Zhao et al. |
| 2020/0007893 | A1* | 1/2020 | Leleannec ............ H04N 19/61 |
| 2020/0014946 | A1 | 1/2020 | Xu et al. |
| 2020/0304816 | A1* | 9/2020 | Zhao .................. H04N 19/157 |
| 2021/0120233 | A1 | 4/2021 | Zhang et al. |
| 2021/0377529 | A1 | 12/2021 | Zhang et al. |
| 2021/0377530 | A1 | 12/2021 | Zhang et al. |

FOREIGN PATENT DOCUMENTS

| | | |
|---|---|---|
| CN | 108702517 A | 10/2018 |
| WO | 2018065250 A1 | 4/2018 |
| WO | 2018129322 A1 | 7/2018 |
| WO | 2018130472 A1 | 7/2018 |
| WO | 2018130473 A1 | 7/2018 |
| WO | 2018132475 A1 | 7/2018 |

OTHER PUBLICATIONS

Chen et al. ""Description of SDR, HDR and 360° Video Coding Technology Proposal by Qualcomm and Technicolor—Low and High Complexity Versions,"" Joint Video Exploration Team (JVET)of ITU-T SG 16 WP 3 and ISO/IEC JTC 1/SC 29/WG 11 10th Meeting, San Diego, US, Apr. 10-20, 2018, document JVET-J0021, 2018.
"High Efficiency Video Coding," Series H: Audiovisual and Multimedia Systems: Infrastructure of Audiovisual Services Coding of Moving Video, ITU-T Telecommunication Standardization Sector of ITU, H.265, Nov. 2019.

Leannec et al. "Assymetric Coding Units in QTBT," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0064, 2016.
Leannec et al. "CE1: Assymetric Binary Tree (tests 1.0.1, 1.0.2, 1.0.3, 1.0.4, 8.0.1, and 8.0.2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0197, 2018.
Li et al. "Multi-Type-Tree," Joint Video Exploration Tree (JVET) of ITU-T SG 16 WP 3 and ISO/IEC JTC 1/SC 29/WG 11, 4th Meeting, Chengdu, CN, Oct. 15-21, 2016, document JVET-D0117, 2016.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Sullivan et al. "Overview of the High Efficiency Video Coding (HEVC) Standard," IEEE Transactions on Circuits and Systems for Video Technology, Dec. 2012, 22(12):1649-1668.
Yuan et al. "Quadtree Based Nonsquare Block Structure for Inter Frame Coding in High Efficiency Video Coding," IEEE Transactions on Circuits and Systems for Video Technology, Dec. 2012, 22(12):1707-1719.
Zhang et al. "CE1: Zero-Unit with Uniform Paring Process (Test 1.2.1 and Test 1.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0268, 2018.
JEM-7.0: hflps://jvet.hhi.fraunhofer.de/svn/svn_HMJEMSoftware/tags/ HM-16.6-JEM-7.0.
https://vcgit.hhi.fraunhofer.de/jvet/VVCSoftware_VTM/tags/VTM-3.1.
http://phenix.it-sudparis.eu/jvet/doc_end_user/current_document.php?id=5755.
International Search Report and Written Opinion from PCT/CN2020/075561 dated May 21, 2020 (11 pages).
International Search Report and Written Opinion from PCT/CN2020/075562 dated May 20, 2020 (10 pages).
International Search Report and Written Opinion from PCT/CN2020/075563 dated Apr. 24, 2020 (11 pages).
Tsai et al. "CE1-Related: Picture Boundary CY Split Satisfying the VPDU Constraint," Joint Video Experts Team (JVET) of ITU-T SG 16 WP 3 abd ISO/IEC JTC 1/SC 29/WG 11 13th Meeting, Marrakech, MA, Jan. 9-18, 2019, document JVET-M0888, 2019.
Non-Final Office Action from U.S. Appl. No. 17/401,447 dated Jul. 20, 2023.

* cited by examiner

FIG. 2

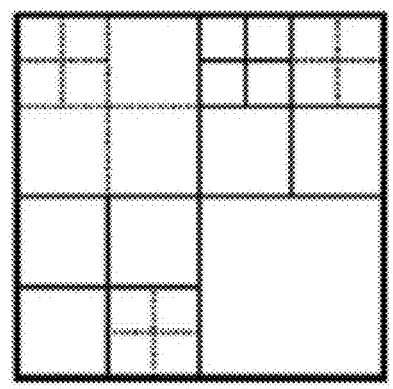
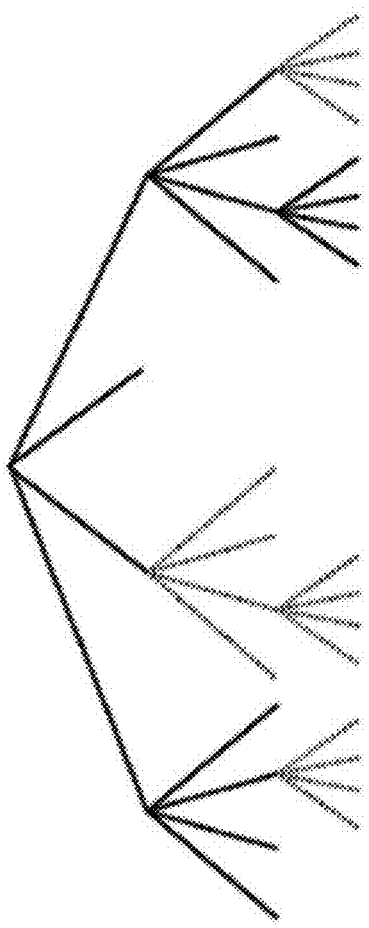
FIG. 3A
FIG. 3B

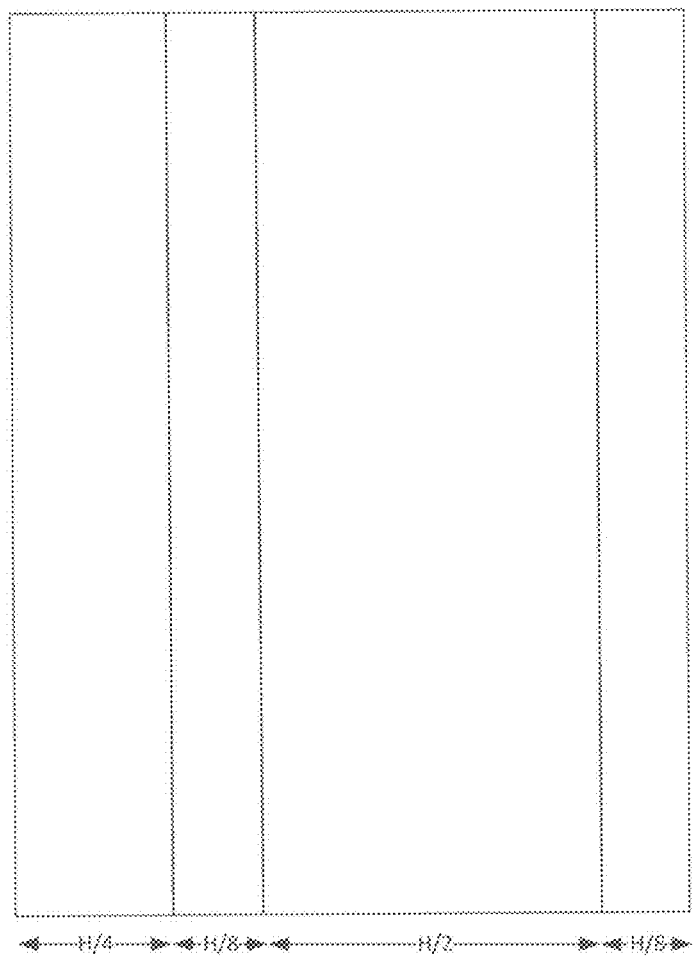

TRANSFORM PARAMETER DERIVATION BASED ON BLOCK PARTITION

This application is a continuation of international No. PCT/CN2020/075562, filed on Feb. 17, 2020, which claims the priority to and benefits of International Patent Application No. PCT/CN2019/075170, filed on Feb. 15, 2019. The entire disclosures of the aforementioned applications are incorporated by reference as part of the disclosure of this application.

TECHNICAL FIELD

The present document relates to video and image coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses video coding tools that, in one example aspect, enable video encoders and decoders to encode or decode video bitstreams in which video blocks are encoded using partitions whose dimensions are non-power-of-two integers.

In one example aspect, a method of video processing is disclosed. The method includes enabling a use of non-power-of-two partition trees (NPT-T) for a conversion between a video and a bitstream representation of the video, wherein the NPT-T includes splitting a video block to one or more smaller sized child blocks of the video block and at least one child block's width or height having a pixel dimension that is a non-power-of-two integer, and performing the conversion using the NPT-T.

In another example aspect, another method of video processing is disclosed. The method includes applying a transform size restriction for a conversion between a child video block and a bitstream representation of the child video block, wherein the child is split from a video block and has a pixel dimension that is a non-power-of-two (NPT) integer, and performing the conversion using the transform size restriction.

In yet another example aspect, another method of video processing is disclosed. The method includes applying, selectively based on a usage rule for using a non-power-of-two tree (NPT-T) splitting of a video block for a conversion between the video block and a bitstream representation of the video block, the video block or one or more smaller sized child blocks of the video have a pixel dimension that is a non-power-of-two (NPT) integer, and performing the conversion using the usage rule.

In yet another example aspect, another method of video processing is disclosed. The method includes applying, selectively based on a use indication, a non-power-of-two tree (NPT-T) splitting of a video block for a conversion between the video block and a bitstream representation of the video block, wherein the video block or one or more smaller sized child blocks of the video have a pixel dimension that is a non-power-of-two (NPT) integer, and performing the conversion corresponding to the use indication.

In another example aspect, another method of video processing is disclosed. The method includes determining, for a conversion between a first block of video and a bitstream representation of the first block of video, whether a use of non-power-of-two partition trees (NPT-T) is enabled or disabled, wherein the NPT-T includes splitting the first block to multiple smaller sized child blocks of the first block, and at least one child block's width and/or height have a dimension that is a non-power-of-two integer; and performing the conversion based on the NPT-T in response to the determination that the NPT-T is enabled.

In another example aspect, another method of video processing is disclosed. The method includes splitting a first block of video into multiple child blocks which comprises a first child block, wherein at least one of width (Wi) and height (Hi) of block size of the first child block is a non-power-of-two integer; determining, for a conversion between the first child block and a bitstream representation of the first child block, transform parameters associated with a transform block for the first child block, wherein one or more of width (TWi) and height (THi) of block size of the transform block being smaller than the width (Wi) and height (Hi) of the first child block and at least one of the TWi or THi is a power of two; and performing the conversion by using the transform parameters.

In another example aspect, another method of video processing is disclosed. The method includes determining, for a conversion between a video and a bitstream representation of the video, whether non-power-of-two partition trees (NPT-T) partition is enabled or disabled, wherein the NPT-T partition include splitting a first block of the video into multiple smaller sized child blocks of the first block, and width (Wi) and/or height (Hi) of at least one child block is a non-power-of-two integer; determining restrictions associated with usage of the NPT-T partition in response to the determination that the NPT-T partition is allowed; and performing the conversion based on the determinations.

In another example aspect, the above-described method may be implemented by a video encoder apparatus or a video decoder apparatus that comprises a processor.

In yet another example aspect, these methods may be stored in the form of processor-executable instructions on a computer-readable program medium.

These, and other, aspects are further described in the present document.

BRIEF DESCRIPTION OF DRAWINGS

FIG. 2 shows example modes for splitting a coding block into a prediction block.

FIG. 3A-3B show a coding tree with its partitioning and a Corresponding quadtree.

FIG. 7A shows an example of EQT Horizontal Mode. FIG. 7B shows an example of EQT Vertical Mode.

FIG. 9A-9H show examples of unsymmetrical quad tree partitions.

DETAILED DESCRIPTION

Figure 1:
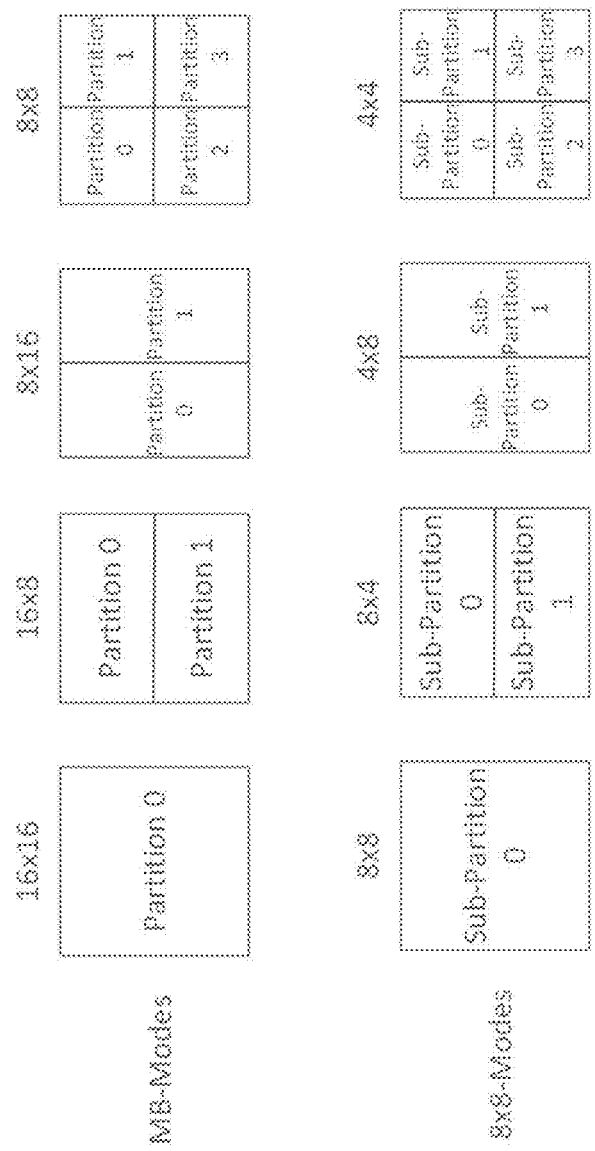
FIG. 1 shows an example of MB partitions in H.264/AVC.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to image/video coding, especially on the transform design of blocks with either width or height unequal to power of 2. More specifically, for such partition structures, how to avoid introducing additional transform/quantization matrices. It may be applied to the existing video coding standard like HEVC, or the standard (Versatile Video Coding) to be finalized. It may be also applicable to future video coding standards or video codec.

2. Brief Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Partition Tree Structure in H.264/AVC

The terminology used in H.264/AVS is macroblock and MB-mode/8×8-mode (partition). Macroblock is the unit wherein each picture/slice is split to and where intra/inter mode decision is applied. And partition defines the level wherein motion information is signalled.

The core of the coding layer in H.264/AVC was the macroblock, containing a 16×16 block of luma samples and, in the usual case of 4:2:0 color sampling, two corresponding 8×8 blocks of chroma samples.

2.1.1 H.264/AVC Main Profile

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its macroblock partitions: 16×8, 8×16, 8×8. An syntax element (MB-mode) is signalled to indicate whether 16×16, 16×8, 8×16 or 8×8 is chosen. If 8×8 is selected, another syntax element (8×8-mode) is further signalled to indicate whether 8×8, 8×4, 4×8, 4×4 (see FIG. 1) is used. Only one motion vector (MV) per partition is allowed.

FIG. 1 shows an example of MB partitions in H.264/AVC. Only 4×4 transform is utilized.

2.1.2 H.264/AVC High Profile

In the high profile, 8×8 transform and I_8×8 (8×8 intra prediction) is introduced. For intra-coded macroblock, the transform size is fixed, I_16×6 and I_4×4 uses 4×4 transform; I_8×8 uses 8×8 transform.

For inter-coded macroblocks, either 4×4 or 8×8 transform could be selected. However, the transform size couldn't cross the partition size. For example, if one macroblock chooses 8×8 partition and further selects 8×4 sub-mode, only 4×4 transform may be applied. If one macroblock chooses 16×16, 16×8, 8×16 8×8 partition with 8×8 sub-mode, then either 4×4 or 8×8 transform could be selected.

2.1.3 Summary

Mode selection is decided in macroblock-level. Transform size shall be no larger than the partition sizes.

2.2 Partition Tree Structure in HEVC

In HEVC, a coding tree unit (CTU, aka largest coding unit, LCU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 2:
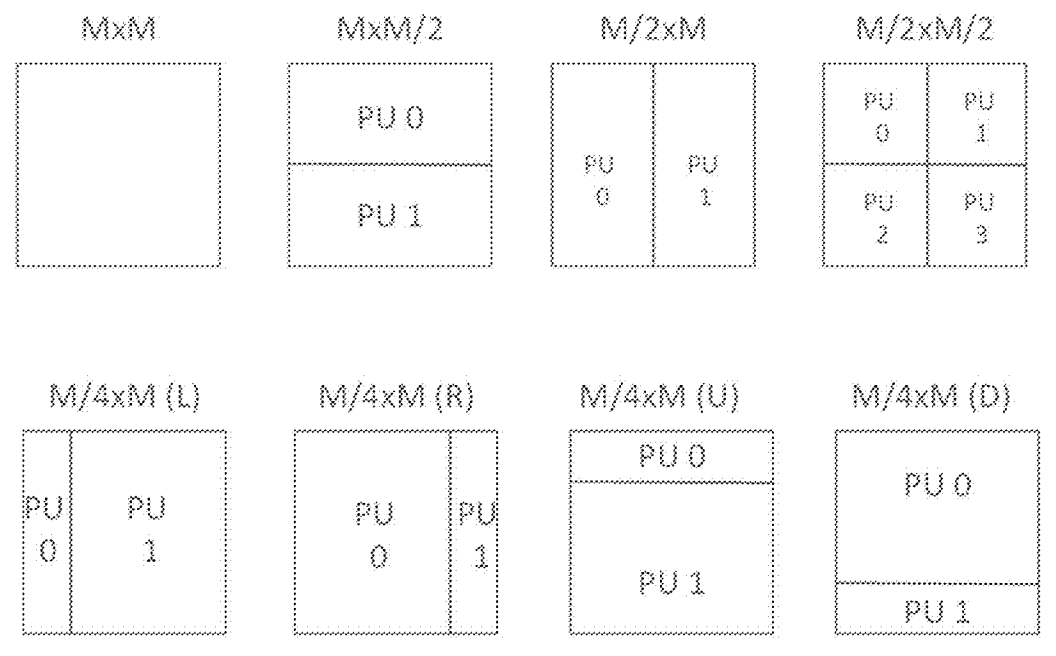

3) Prediction units (PUs) and prediction blocks (PBs): The decision whether to code a picture area using inter picture or intra picture prediction is made at the CU level. A PU partitioning structure has its root at the CU level. Depending on the basic prediction-type decision, the luma and chroma CB s can then be further split in size and predicted from luma and chroma prediction blocks (PBs). HEVC supports variable PB sizes from 64×64 down to 4×4 samples. FIG. 2 depicts the allowed PBs.

FIG. 2 shows example modes for splitting a CB into PBs, subject to certain size constraints. For intra picture-predicted CBs, only M×M and M/2×M/2 are supported.

4) Transform units (Tus) and transform blocks: The prediction residual is coded using block transforms. A TU tree structure has its root at the CU level. The luma CB residual may be identical to the luma transform block (TB) or may be further split into smaller luma TB s. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIG. 3A-3B shows example subdivision of a CTB into CBs and TBs. Solid lines indicate CB boundaries and dotted lines indicate TB boundaries.

2.2.1 Depth of Quadtree

For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra picture-predicted CUs, the decoded samples of the nearest-neighboring TBs (within or outside the CB) are used as reference data for intra picture prediction.

2.2.2 Summary

One CTU may be recursively split into multiple CUs based on increased depth of quadtree. Only square CB and TB partitioning is specified, where a block can be recursively split into quadrants, as illustrated in FIG. 3A-3B.

Mode selection is decided in CU-level. Side information according to a selected mode is signaled in PU-level, such as motion information, intra prediction modes. Residual are signaled in TU-level.

One PU shall be no larger than CU for inter-coded blocks and one PU shall be equal to CU for intra-coded blocks.

TU could cross PU for inter-coded blocks, but shall be equal to PU for intra-coded blocks.

2.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT Block Partitioning Structure

Figure 5:
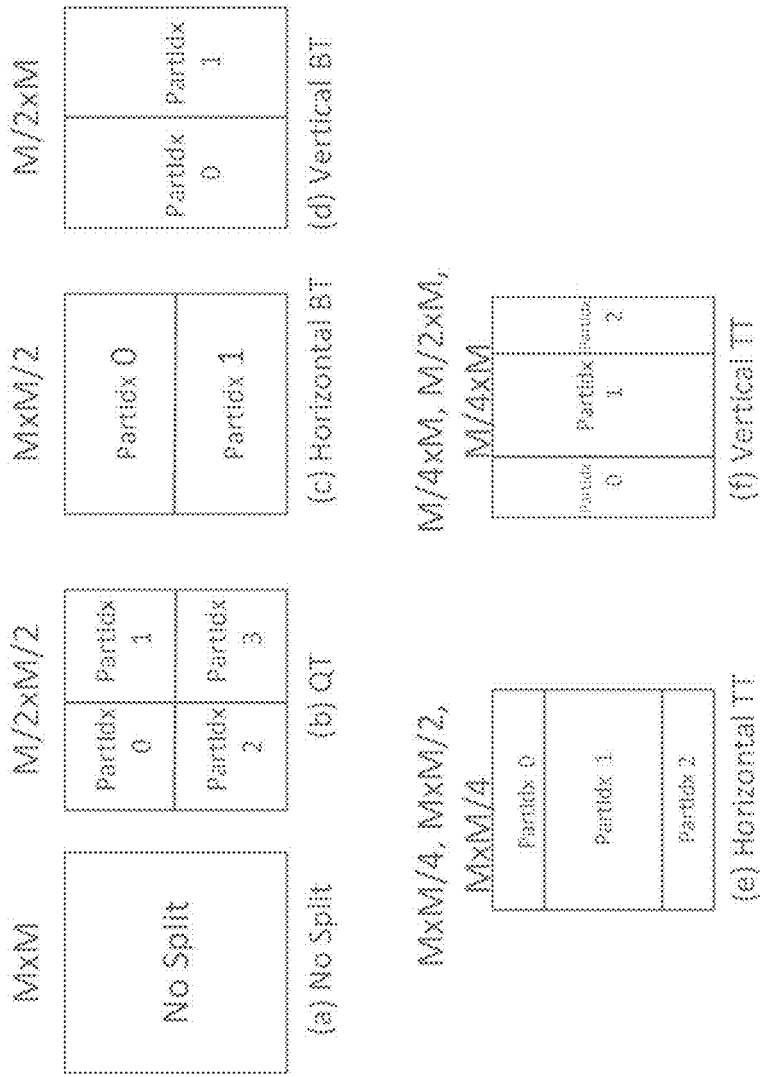
FIG. 5 shows examples of allowed partitions in video coding.

Different from HEVC, the QTBT structure removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 4B:
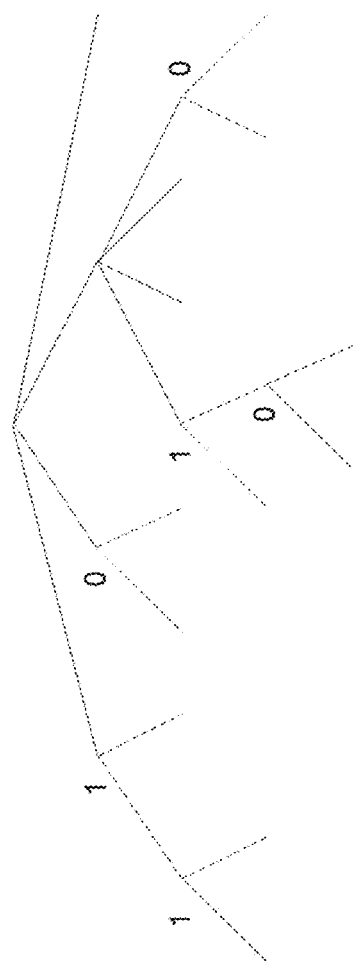
FIG. 4A-4B provide an example illustration of a QTBT structure.
Figure 4A:
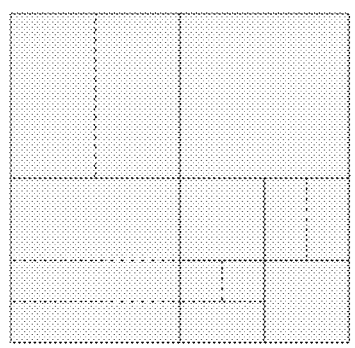

FIG. 4A illustrates an example of block partitioning by using QTBT, and FIG. 4B illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

FIGS. 4A-4B provide an example illustration of a QTBT structure.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.3.2 Summary of QTBT

One CTU may be recursively split into multiple CUs based on increased depth of quadtree or binary tree. Square and rectangular CB (with width/height equal to ½ or 2) is specified.

Mode selection is decided in CU-level. PU and TU are always equal to CU.

2.4 Multiple Type Trees (MTT) for VVC 2.4.1 Proposal

It proposed that tree types other than quad-tree and binary-tree are supported. In the implementation, two more ternary tree (TT) partitions, i.e., horizontal and vertical center-side triple-trees are introduced, as shown in FIGS. 5 (e) and (f).

FIG. 5 Examples of allowed partitions in VVC: (a) no further split (b) quad-tree partitioning (c) horizontal binary-tree (Horizontal BT) partitioning (d) vertical binary-tree (Vertical BT) partitioning (e) horizontal center-side ternary-tree (Horizontal TT) partitioning (f) vertical center-side ternary-tree partitioning (Vertical TT)

It is Note that the One Partition in BT/TT May be Further Split with BT/TT. Therefore, Rectangular Blocks are Allowed.

There are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.4.2 Partition Tree in VVC

Three types of partition structures are supported, i.e., QT, BT and TT. A block split from QT may be further split by QT/BT/TT. a block split from BT or TT may be further split to BT or TT. However, a block split from BT or TT couldn't be further split to QT anymore.

Figure 6:
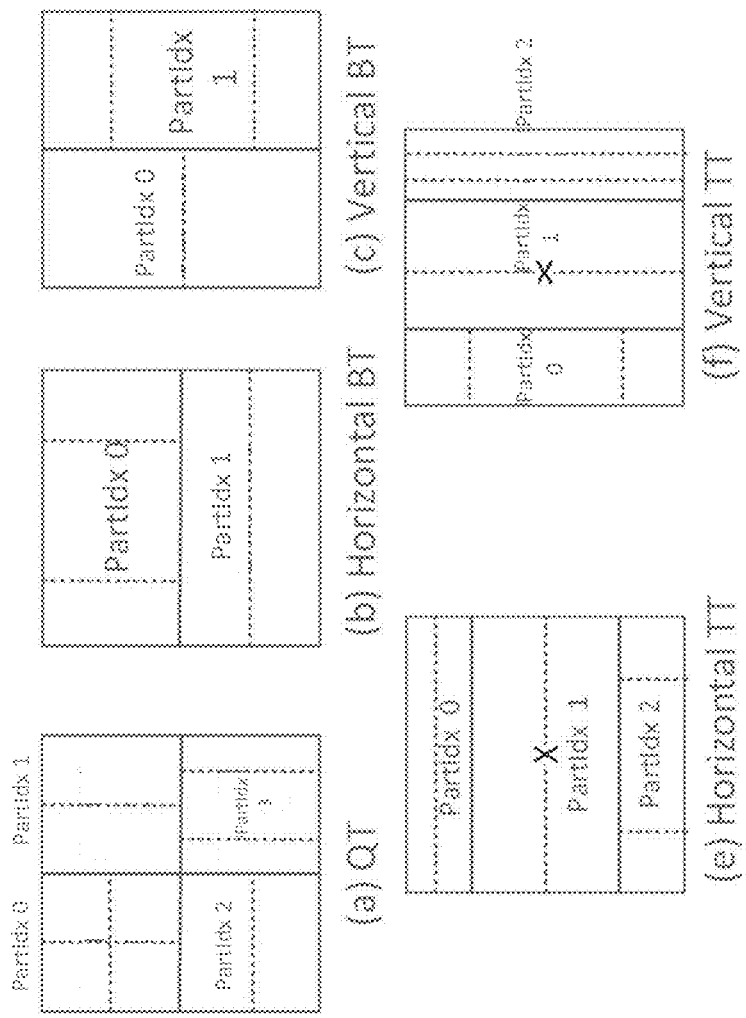
FIG. 6 shows examples of allowed partitions between parent split (solid lines) and current split (dashed lines).

FIG. 6 shows examples of allowed partitions between parent split (solid lines) and current split (dashed lines). Line with 'X' means such partition is disallowed. In VVC, several variables are signalled/derived to control the usage of different partitions. For example:

maximum multi-type tree depth with offset maxMttDepth for luma and chroma, respectively, maximum binary tree size maxBtSize/ternary tree size maxTtSize minimum quadtree size MinQtSize/binary tree size MinBtSize/ternary tree size minTtSize 2.4.2.1.1 Allowed Binary Split Process Inputs to this process are:

a binary split mode btSplit, a coding block width cbWidth, a coding block height cbHeight, a location (x0, y0) of the top-left luma sample of the considered coding block relative to the top-left luma sample of the picture, a multi-type tree depth mttDepth, a maximum multi-type tree depth with offset maxMttDepth, a maximum binary tree size maxBtSize, a partition index partIdx.

Output of this process is the variable allowBtSplit.

TABLE 2-1

Specification of parallelTtSplit and cbSize based on btSplit

| | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variables parallelTtSplit and cbSize are derived as specified in Table 2-1.

The variable allowBtSplit is derived as follows:

If one or more of the following conditions are true, allowBtSplit is set equal to FALSE:

//according to block size and maximum allowed MTT depth cbSize is less than or equal to MinBtSizeY cbWidth is greater than maxBtSize cbHeight is greater than maxBtSize mttDepth is greater than or equal to maxMttDepth Otherwise, if all of the following conditions are true, allowBtSplit is set equal to FALSE //according to picture boundary (no vertical BT for bottom picture boundary and bottom-right picture boundary)

btSplit is equal to SPLIT_BT_VER y0+cbHeight is greater than pic_height_in_luma_samples Otherwise, if all of the following conditions are true, allowBtSplit is set equal to FALSE //according to picture boundary (no horizontal BT for right picture boundary)

btSplit is equal to SPLIT_BT_HOR x0+cbWidth is greater than pic_width_in_luma_samples y0+cbHeight is less than or equal to pic_height_in_luma_samples Otherwise, if all of the following conditions are true, allowBtSplit is set equal to FALSE:
 //according to TT partition in above level (mttDepth−1)
 mttDepth is greater than 0
 partIdx is equal to 1
 MttSplitMode[x0][y0][mttDepth−1] is equal to parallelTtSplit
//according to transform sizes (e.g., when MaxTbSizeY is equal to 64, for 64×128, no vertical BT; for 128×64, no horizontal BT)
 Otherwise if all of the following conditions are true,
  allowBtSplit is set equal to FALSE
  btSplit is equal to SPLIT_BT_VER
  cbWidth is less than or equal to MaxTbSizeY
  cbHeight is greater than MaxTbSizeY
 Otherwise if all of the following conditions are true,
  allowBtSplit is set equal to FALSE
  btSplit is equal to SPLIT_BT_HOR
  cbWidth is greater than MaxTbSizeY
  cbHeight is less than or equal to MaxTbSizeY
 Otherwise, allowBtSplit is set equal to TRUE.
2.4.2.1.2 Allowed Ternary Split Process
Inputs to this process are:
 a ternary split mode ttSplit,
 a coding block width cbWidth,
 a coding block height cbHeight,
 a location (x0, y0) of the top-left luma sample of the considered coding block relative to the top-left luma sample of the picture,
 a multi-type tree depth mttDepth
 a maximum multi-type tree depth with offset maxMttDepth,
 a maximum binary tree size maxTtSize.
Output of this process is the variable allowTtSplit.

TABLE 2-2

Specification of cbSize based on ttSplit.

| | ttSplit == SPLIT_TT_VER | ttSplit == SPLIT_TT_HOR |
|---|---|---|
| cbSize | cbWidth | cbHeight |

The variable cbSize is derived as specified in Table 2-2.
The variable allowTtSplit is derived as follows:
 If one or more of the following conditions are true, allowTtSplit is set equal to FALSE:
  //according to block size
  cbSize is less than or equal to 2*MinTtSizeY
  cbWidth is greater than Min(MaxTbSizeY, maxTtSize)
  cbHeight is greater than Min(MaxTbSizeY, maxTtSize)
  //according to maximum allowed MTT depth
  mttDepth is greater than or equal to maxMttDepth
  //according to whether it is located at picture boundary
  x0+cbWidth is greater than pic_width_in_luma_samples
  y0+cbHeight is greater than pic_height_in_luma_samples
 Otherwise, allowTtSplit is set equal to TRUE.
2.5 Partition Tree Structure in AVS3
In AVS3, Extended Quad-tree (EQT) partitioning is adopted, which further extends the QTBT scheme and increases the partitioning flexibility. More specially, EQT splits a parent CU into four sub-CUs of different sizes, which can adequately model the local image content that cannot be elaborately characterized with QTBT. Meanwhile, EQT partitioning allows the interleaving with BT partitioning for enhanced adaptability.

Figure 7B:
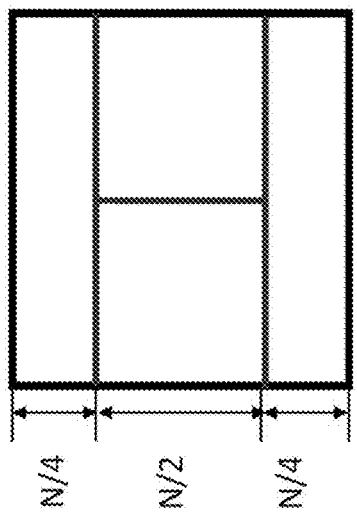
FIG. 7A-7B are as follows.
Figure 7A:
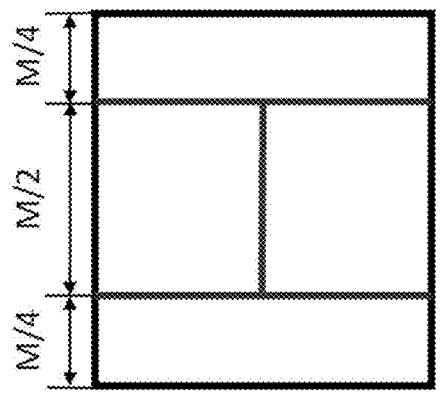

With the EQT partitioning, a parent CU is split into four sub-CUs with different sizes. As shown in FIG. 7A-7B, EQT divides a M×N parent CU into two M×N/4 CUs and two M/2×N/2 CUs in the horizontal direction. Analogously, EQT vertical partitioning generates two N×M/4 CUs and two M/2×N/2 CUs. In particular, EQT sub-blocks size is always the power of 2, such that additional transformations are not necessarily involved.

FIG. 7A shows an example of EQT Horizontal Mode.
FIG. 7B shows an example of EQT Vertical Mode.

In the structure of QTBT, a QT splitting flag is first signaled to indicate whether the current CU is split by QT. As such, when this ag is false, the second signal will be encoded to denote whether the current CU splitting mode is non-splitting or BT splitting. For a BT splitting CU, the third bin (DIR) is signaled to discriminate horizontal BT or vertical BT splitting. When EQT partitioning is introduced, one additional bin termed as is EQT is signaled to indicate whether it is an EQT-split, in case that BT and EQT are both available, as shown in FIG. 8.

Figure 8:
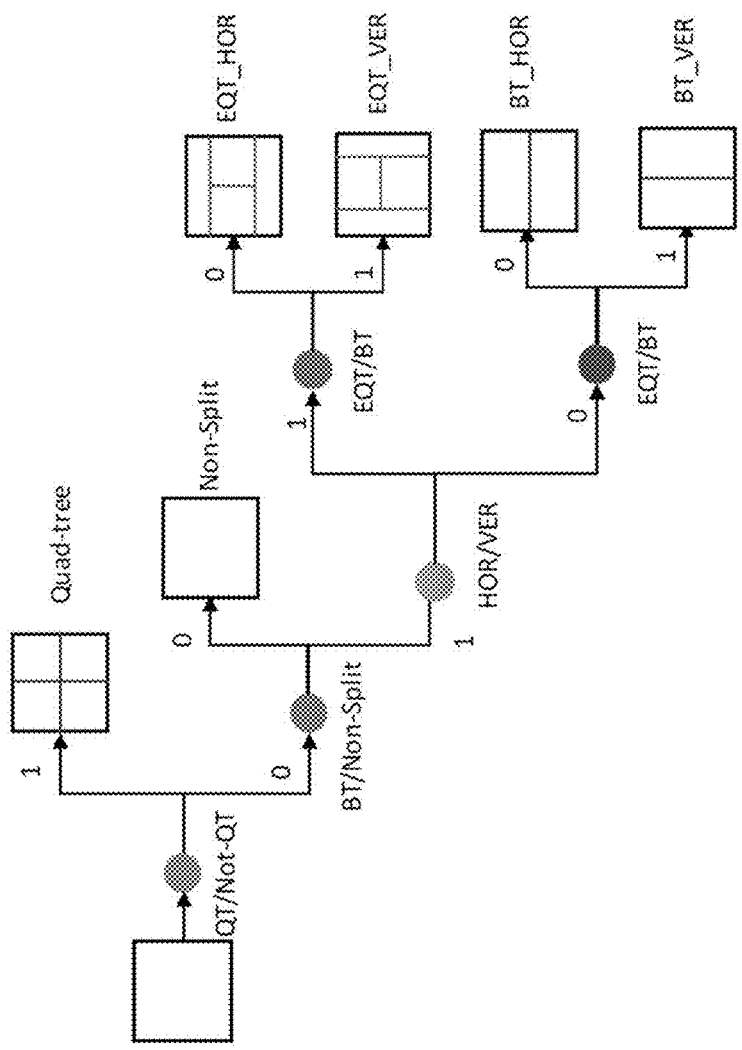
FIG. 8 shows the signaling structure of quadtree binary tree (QTBT) plus EQT partitioning.
Figure 9A:
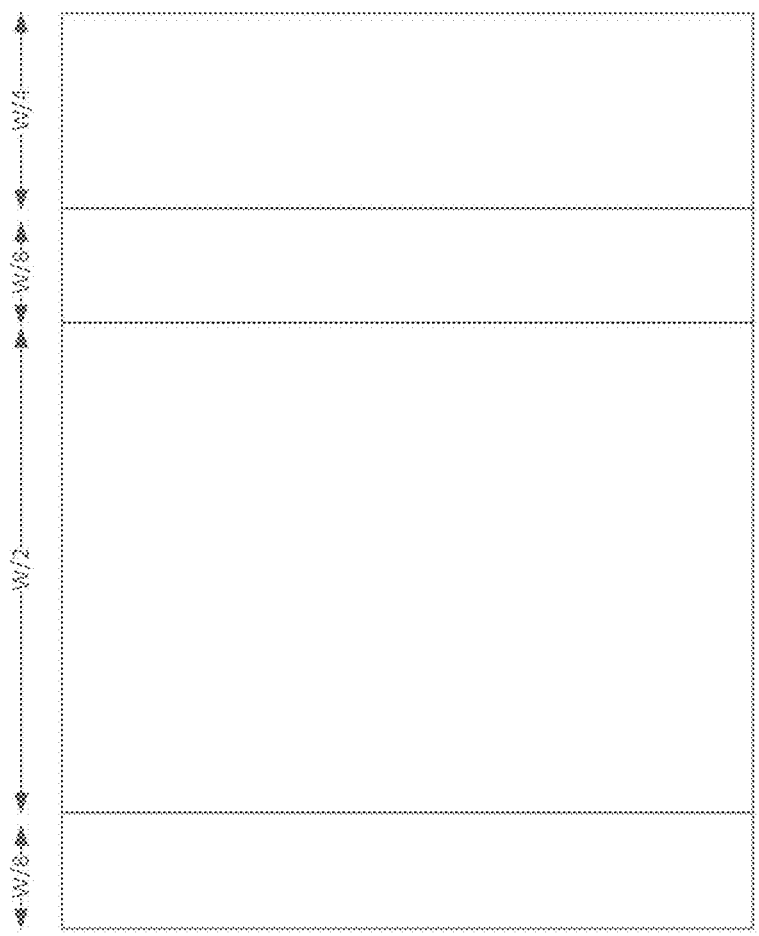
Figure 9B:
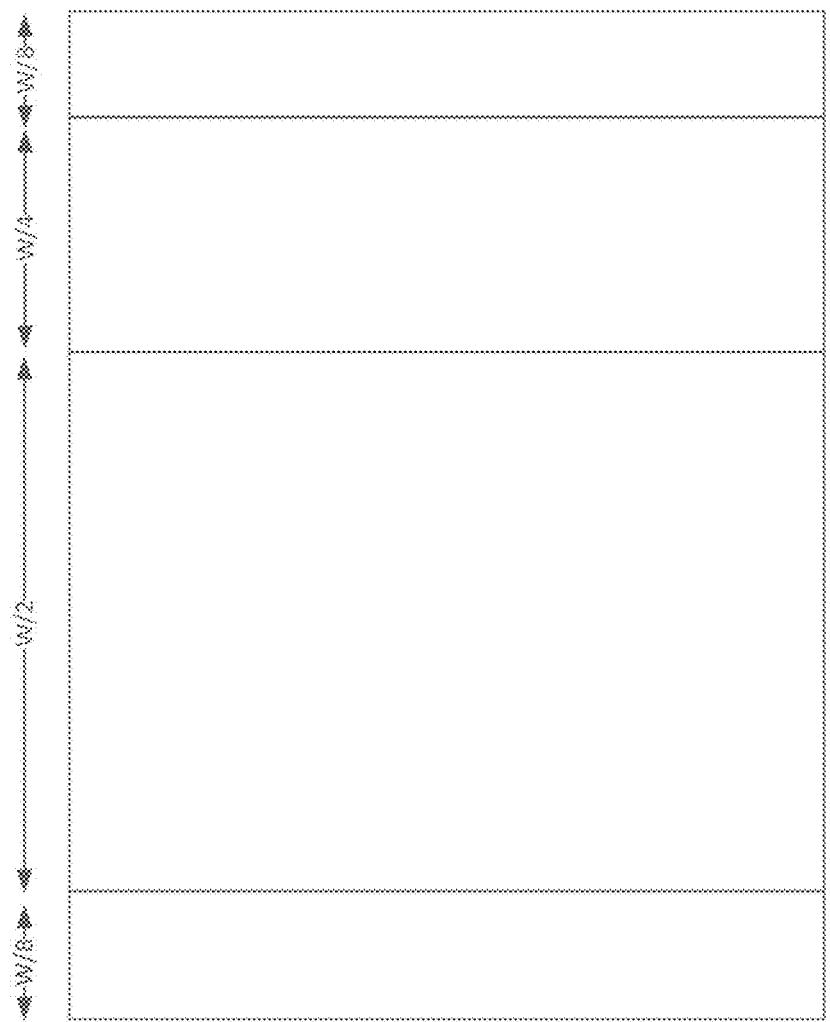
Figure 9C:
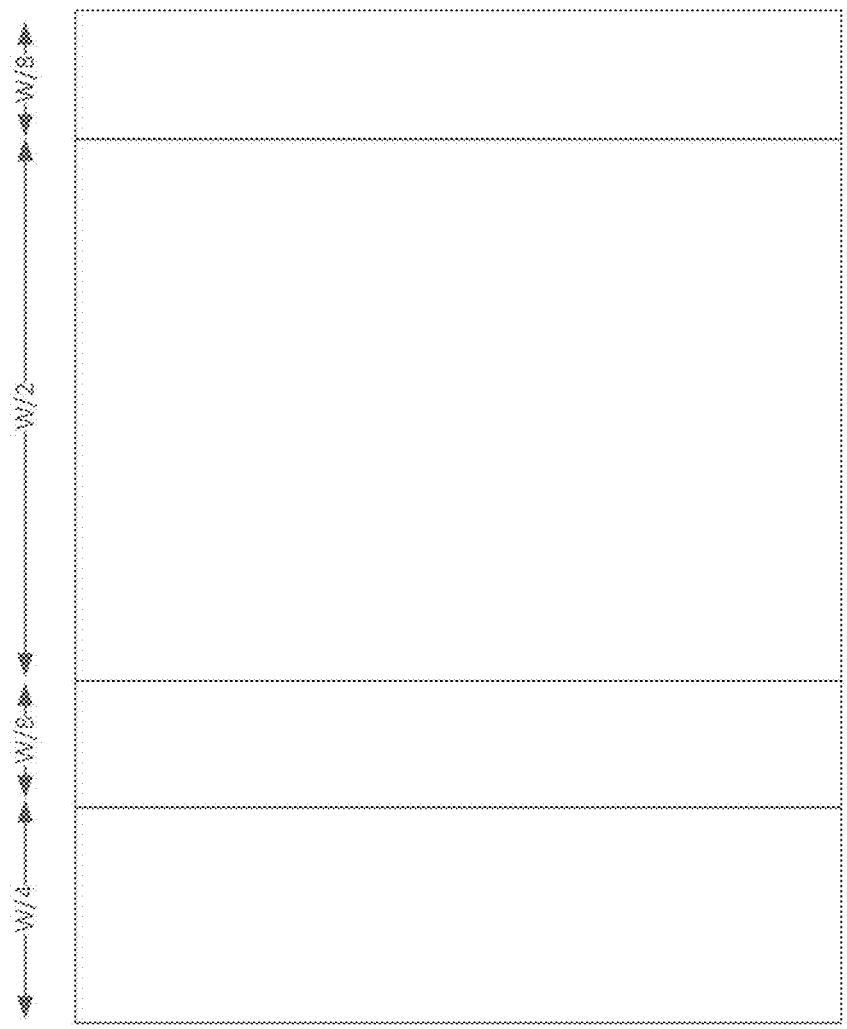
Figure 9D:
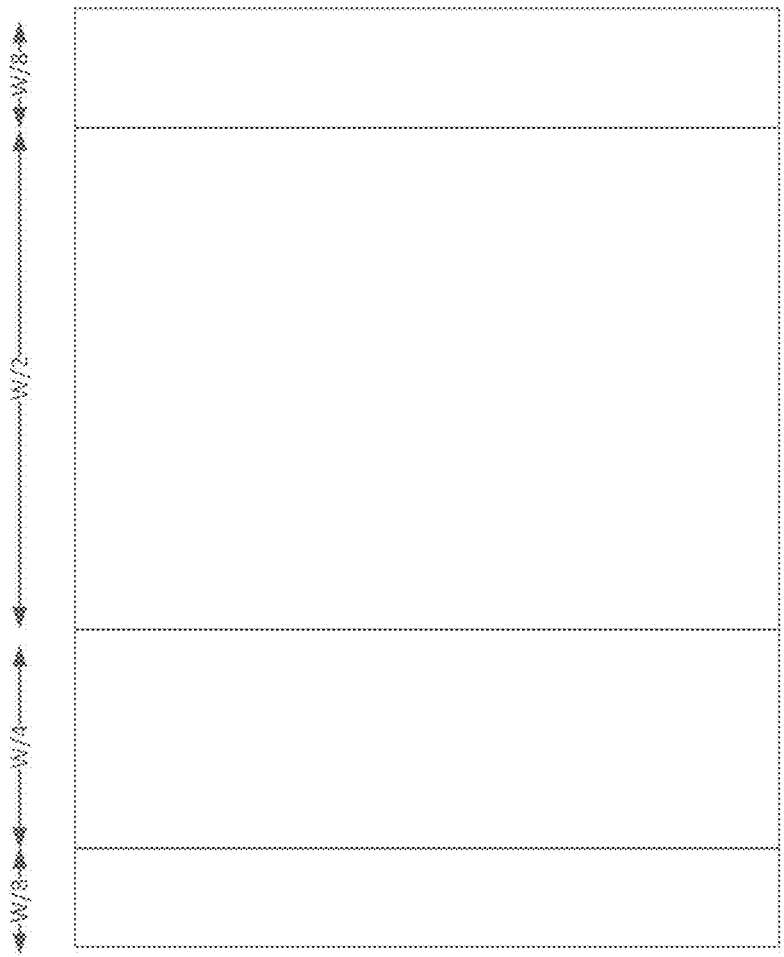
Figure 9E:
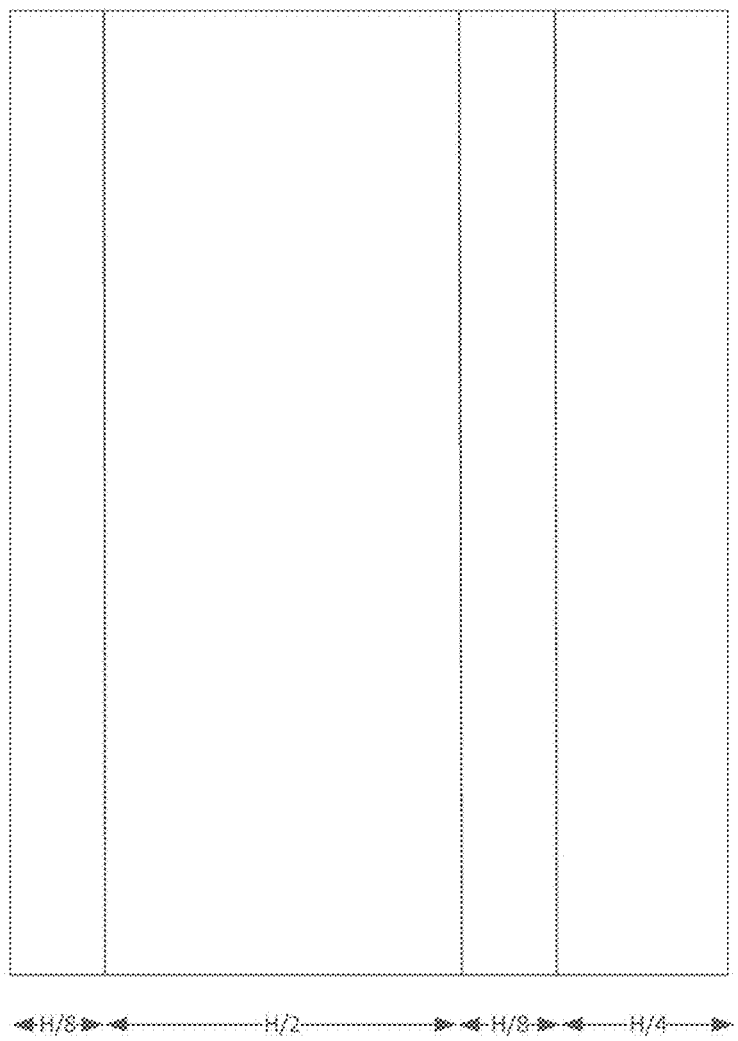
Figure 9F:
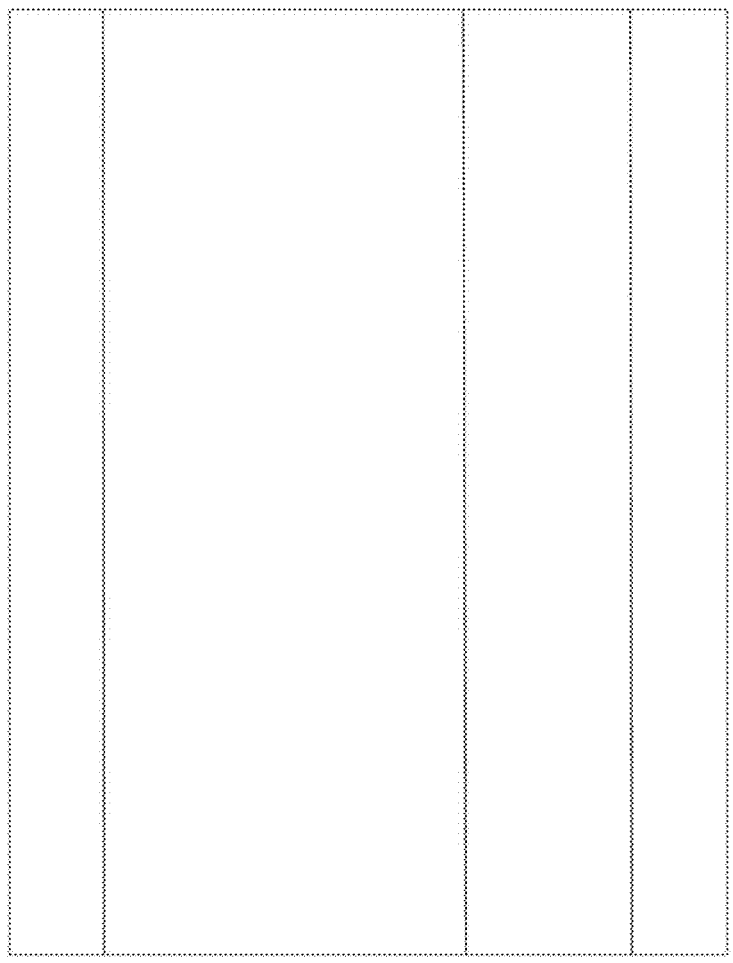
Figure 9H:
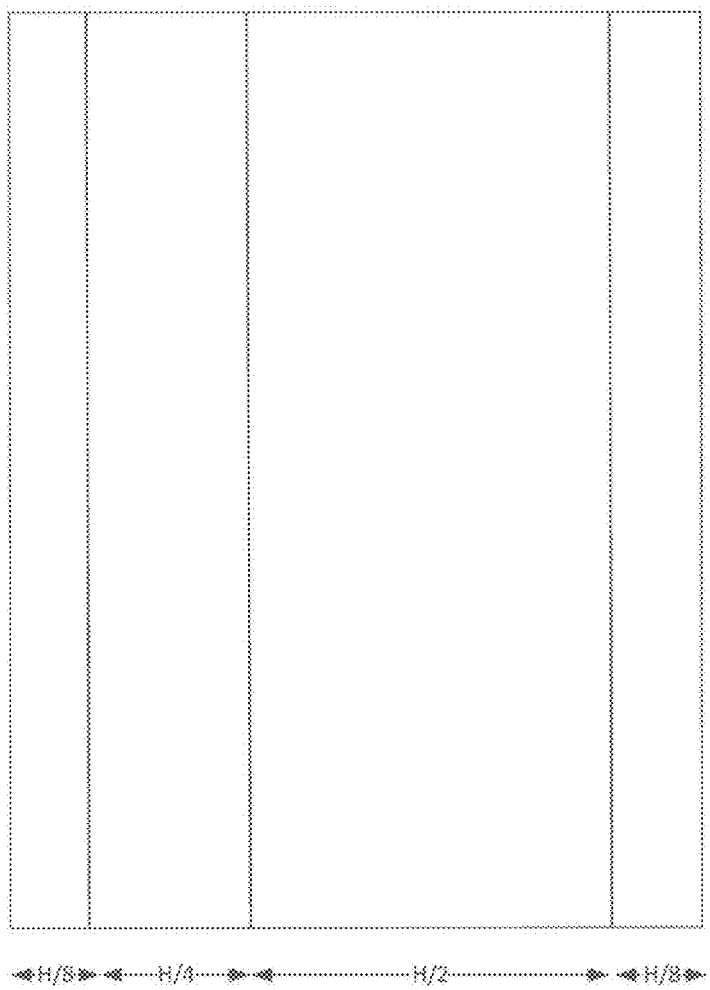

FIG. 8 shows the signaling structure of QTBT plus EQT partitioning.

2.6 UQT
Unsymmetrical Quad-Tree (UQT) partitioning is proposed. With UQT, a block with dimensions W×H is split into four partitions with dimensions W1×H1, W2×H2, W3×H3 and W4×H4, where W1, W2, W3, W4, H1, H2, H3, H4 are all integers. All the parameters are in the form of power of 2. For example, $W1=2^{N1}$, $W2=2^{N2}$, $W3=2^{N3}$, $W4=2^{N4}$, $H1=2^{M1}$, $H2=2^{M2}$, $H3=2^{M3}$, $H4=2^{M4}$. Some examples are given in FIG. 9A-9H.

FIGS. 9A-9H show some cases of UQT.

2.7 UQI-T
Several methods are proposed to introduce other kinds of partition structures that may split one block to more than 4 partitions.

In one example, Quinary-Tree (QUI-T) partitioning is proposed. An example is shown in FIG. 10A-10B.

Figure 10B:
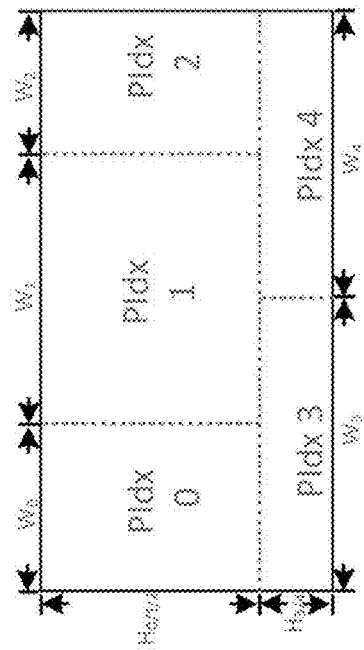
FIG. 10A-10B show examples of quinary tree partitioning.
Figure 10A:
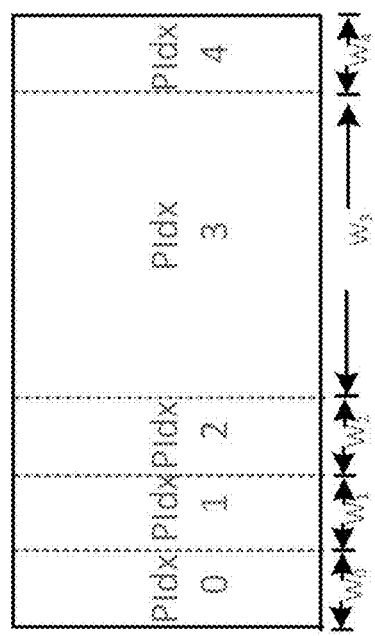

FIGS. 10A-10B show example cases of UQI-T by splitting one W*H block to five smaller blocks.

FIG. 10A shows W0+W1+W2+W3+W4=W; H0=H1=H2=H3=H4=H.

FIG. 10B shows W0+W1+W2=W3+W4=W; H0=H1=H2; H3=H4; H0+H3=H

In addition, other Senary-, Septenary-, Octonary-Tree partitions (SnT, StT, OctT) wherein one block may be split to 6, 7, or 8 smaller blocks.

Figure 11:
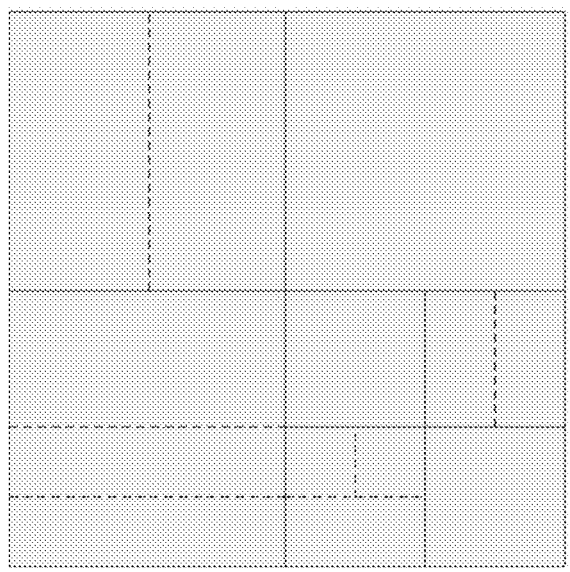
FIG. 11 shows an example of a QTBT partitioning.

2.8 Asymmetric Binary Tree Structure
The tree structure used in this response, called Multi-Tree Type (MTT), is a generalization of the QTBT. In QTBT, as shown in FIG. 11, a Coding Tree Unit (CTU) is firstly partitioned by a quad-tree structure. The quad-tree leaf nodes are further partitioned by a binary-tree structure.

FIG. 11 shows an example of a QTBT structure.

Figure 12:
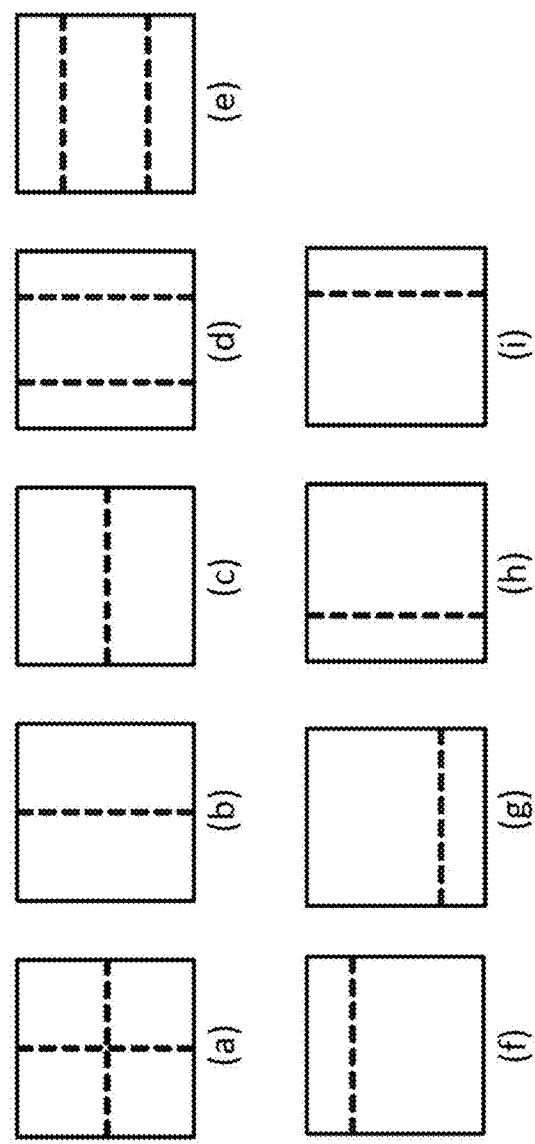
FIG. 12 shows different partitions used in video coding.

The fundamental structure of MTT constitutes of two types of tree nodes: Region Tree (RT) and Prediction Tree (PT), supporting nine types of partitions, as shown in FIG. 12. A region tree can recursively split a CTU into square blocks down to a 4×4 size region tree leaf node. At each node in a region tree, a prediction tree can be formed from one of three tree types: Binary Tree, Triple Tree, and Asymmetric Binary Tree (ABT, as depicted in FIG. 12 (f) to (i)). In a PT split, it is prohibited to have a quadtree partition in branches of the prediction tree. As in JEM, the luma tree and the chroma tree are separated in I slices.

FIG. 12 shows (a) quad-tree partitioning (b) vertical binary-tree partitioning (c) horizontal binary-tree partitioning (d) vertical triple-tree partitioning (e) horizontal triple-tree partitioning (f) horizontal-up asymmetric binary-tree partitioning (g) horizontal-down asymmetric binary-tree partitioning (h) vertical-left asymmetric binary-tree partitioning (i) vertical-right asymmetric binary-tree partitioning.

2.8.1 Transform/Quantization

To accommodate more flexible partitioning due to ABT, where a block size is not power of 2, such as 4×24 and 8×48, corresponding transform cores are included.

In total, additional transforms of 6-point, 12-point, 24-point, 48-point have been added.

3. Problems Solved by Disclosed Embodiments.

Although the ABT partition could bring additional coding gain, it meanwhile increases the decoder complexity by adding several new transforms matrices.

Meanwhile, only asymmetric binary partition tree (i.e., ABT) has been tried while other kinds of partitions that may split one block into more than 2 asymmetric partitions are not fully studied yet.

4. Examples of Techniques

To address the problem, several methods are proposed to introduce other kinds of partition structures that may split one block (may also be named as one parent block) to smaller blocks (may also be named as child blocks) with at least one block's width/height or both width and height are unequal to power of 2. Such a partition is called non-power-two-partition tree (NPT-T).

The detailed techniques below should be considered as examples to explain general concepts. These embodiments should not be interpreted in a narrow way. Furthermore, these embodiments can be combined in any manner.

In the following discussion, partition trees may indicate QT, BT, TT or Unsymmetrical Quad-Tree (UQT), EQT or others. While partition/splitting directions may indicate the horizontal splitting or vertical splitting or diagonal splitting or others. One partition is denoted by its partition tree type and partition direction.

QT, BT, TT, UQT, or EQT may refer to "QT split", "BT split", "TT split", "UQT split", "EQT split", respectively.

In the following discussion, "split" and "partitioning" have the same meaning. The proposed methods may be also applicable to existing partition trees.

Function floor (x) returns the greatest integer less than or equal to x.

4.1 Examples of NPT-T

1. NPT-T partitioning is proposed wherein width and/height of at least one split smaller block is not in the form of power of 2. With NPT-T, a block with dimensions W×H is split into K smaller blocks (K>1, K is an integer value). When the indication of using such partitioning is true, such a block is directly split into K smaller ones (a.k.a. child blocks). The smaller one may be treated as a coding unit/a prediction unit/a transform unit.

Each dimension of the smaller block may be denoted by $W_i \times H_i$ (i being 0 . . . (K−1), indicating the partition index) and $W_i$, $H_i$ are all integers.
   a. In one example, each child block may be further split into even smaller blocks, such as in a recursive way.
   b. In one example, K>2. That is, one block may split to at least three smaller blocks.
      (a) Alternatively, K is equal to 2, however, it may choose different ways of splitting method instead of using (¼ W or ¼ H in the ABT design).
   c. In one example, at least one $W_i$ or $H_i$ is NOT in the form of power of 2.
      (a) For example, $W_0 \neq 2^{N0}$, and/or $W_1 \neq 2^{N1}$, and/or $W_2 \neq 2^{N1}$, and/or $W_3 \neq 2^{N3}$, and/or $W_4 \neq 2^{N4}$, and/or $H_0 \neq 2^{M0}$, and/or $H_1 \neq 2^{M1}$, and/or $H_2 \neq 2^{M2}$, and/or $H_3 \neq 2^{M3}$, and/or $H_4 \neq 2^{M4}$.
      (b) Alternatively, furthermore, at least one $W_i$ or $H_i$ is in the form of power of 2.
         1. In one example, $W_i$ is equal to $2^{floor(log 2(W/K))}$.
         2. In one example, $H_i$ is equal to $2^{floor(log 2(H/K))}$.
         3. In one example, $W_i$ may be different from $W_j$ if i is not equal to j.
         4. In one example, $H_i$ may be different from $H_j$ if i is not equal to j.
   d. In one example, at least one $W_i$ is set to floor (W*m/$2^n$) wherein W>=$2^n$ and 1<=m<$2^n$.
   e. In one example, at least one $H_i$ is set to floor(H*m/$2^n$) wherein H>=$2^n$ and 1<=m<$2^n$.
   f. In one example, a block split from NPT-T may be further split according to NPT-T.
   g. In one example, a block with either width or height not in the form of power 2 may not be able to split according to NPT-T. Alternatively, furthermore, signalling of the usage of NPT-T is skipped.
   h. In one example, a non-square block with width unequal to height may not be able to split according to NPT-T. Alternatively, furthermore, signalling of the usage of NPT-T is skipped.
   i. In one example, a square block with width equal to height may not be able to split according to NPT-T. Alternatively, furthermore, signalling of the usage of NPT-T is skipped.
   j. In one example, a block with width or height not in the form of power of two must be split. Alternatively, furthermore, signalling of the split flag is skipped.

4.2 Partition Directions of NPT-T

Figure 13A:
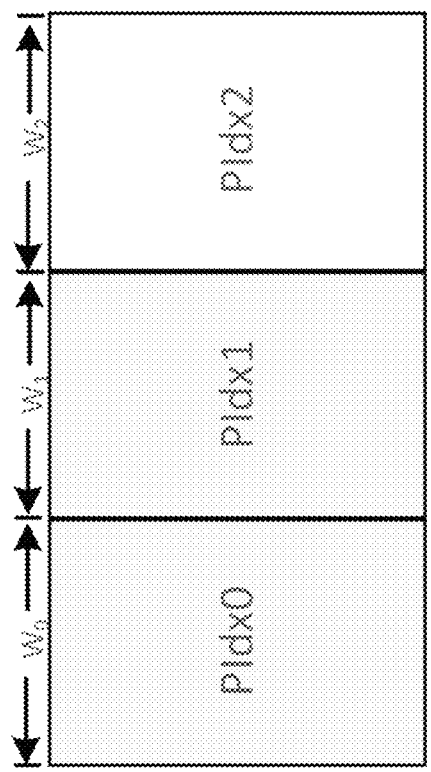
FIG. 13A shows an example where PIdx0 and PIdx1 are with same sizes.
Figure 13B:
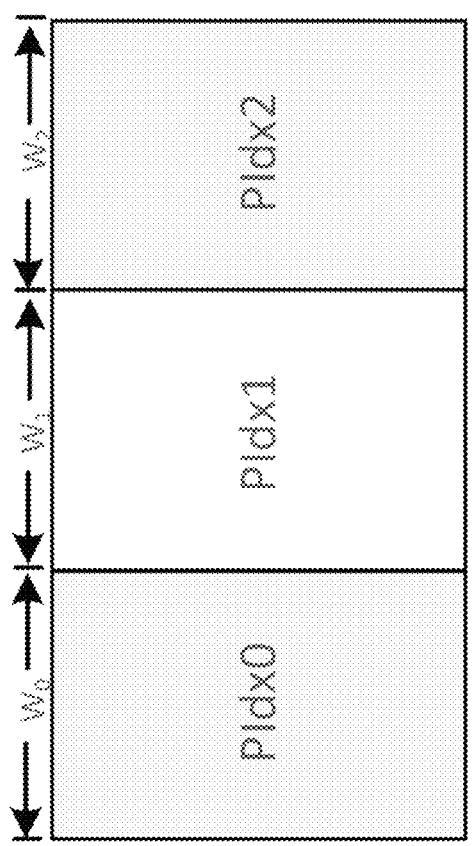
FIG. 13B shows an example where PIdx0 and PIdx2 are with same sizes.
Figure 13C:
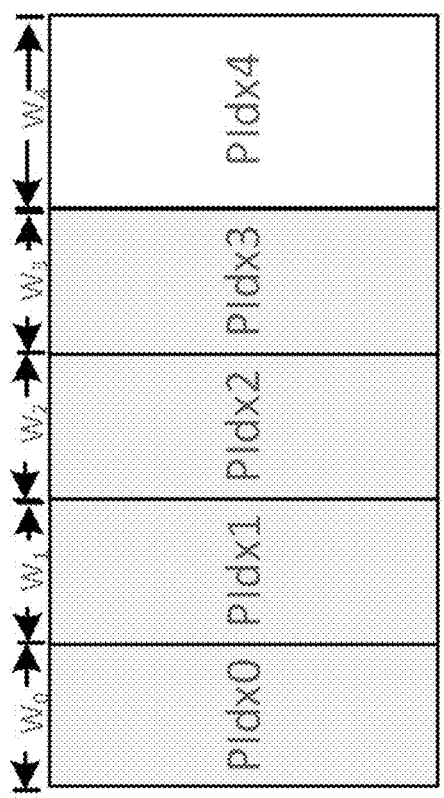
FIG. 13C shows an example with K=5, $L_0$=4.

2. NPT-T May Split One Block Only in Vertical Direction.
   a. For example, $H_i$=H (for i being 0 . . . (K−1)).
   b. In one example, $L_0$ partitions ($L_0$ equal to 2 . . . K) share the same partition sizes.
      (a) In one example, the width of the same partition size is set to floor (W/K).
      (b) In one example, the $L_0$ partitions may be located at the neighboring of the other one. Alternatively, they may be located not next to each other.
      (c) In one example, the $L_0$ partitions may be given consecutively partition indices which indicates one partition shall be coded directly before or after another one.
      (d) Some examples with $L_0$=2 and K=3 are given in FIG. 13.
         i. In FIG. 13A, $W_0$=$W_1$=floor(W/3) and $W_2$=W−2*floor(W/3).
         ii. In FIG. 13B, $W_0$=$W_2$=floor(W/3) and $W_1$=W−2*floor(W/3).
         iii. In FIG. 13C, $W_0$=$W_1$=$W_2$=$W_3$=floor(W/5) and $W_4$=W−4*floor(W/5).

FIG. 13A shows an example where PIdx0 and PIdx1 are with same sizes.

FIG. 13B shows an example where PIdx0 and PIdx2 are with same sizes.

FIG. 13C shows an example with K=5, $L_0$=4.

Figure 14:
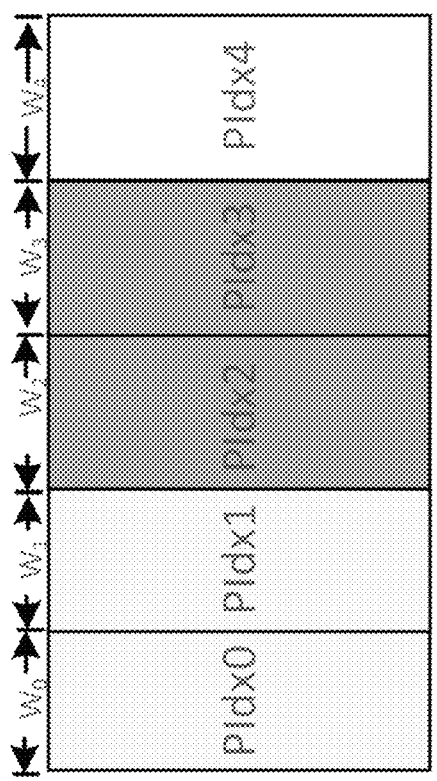
FIG. 14 shows examples of non-power-of-two tree (NPT-T) partitions (with K=5, $L_0$=2, $L_1$=2).

FIGS. 13A-13C show Examples of NPT-T partitions (with K=3, $L_0$=2 for (a) and (b)).

c. Alternatively, furthermore, $L_1$ of the remaining (K−$L_0$) partitions may be assigned with equal sizes.
        (a) In one example, $L_1$ is in the range of [1 . . . K−$L_0$].
        (b) In one example, the width of the $L_1$ partition size is set to floor ((W−$L_0$*floor (W/K))/(K−$L_0$)). Alternatively, when $L_1$ is equal to (K−$L_0$−1), furthermore, one left partition may be assigned with block width equal to W−$L_0$*floor(W/K)−((W−$L_0$*floor (W/K))/(K−$L_0$))*(K−$L_0$−1).
        (c) Alternatively, the remaining (K−$L_0$) partitions may be assigned with different sizes.
        (d) In one example, the $L_1$ partitions may be located at the neighboring of the other one. Alternatively, they may be located not next to each other.
        (e) In one example, the $L_1$ partitions may be given consecutively partition indices which indicates one partition shall be coded directly before or after another one. Alternatively, they may be given partition indices not consecutively.
        (f) Some examples with $L_0$=2, $L_1$=2 and K=5 are given in FIG. 14. In FIG. 14, $W_0$=$W_1$=floor(W/5), $W_2$=$W_3$=floor ((W−2*floor(W/5))/3) and $W_4$=W−2*$W_0$−2*$W_1$.

FIG. 14 shows examples of NPT-T partitions (with K=5, $L_0$=2, $L_1$=2).

d. In one example, only one partition size ($W_i$×$H_i$) is different from all the remaining partitions.
        (a) For example, L0 is equal to K−1.
    e. In one example, partition size ($W_i$×$H_i$) may be the same for all partitions.

3. NPT-T may split one block only in horizontal direction.
    a. The sub-bullets in bullet 2 may be applied by swapping H with W.

4. NPT-T may split one block in both horizontal and vertical directions. Such case is named as mixed direction.
    a. For example, at least one of $W_i$ is unequal to W.
    b. For example, at least one of $H_i$ is unequal to H.

5. NPT-T may split one block in vertical direction if width of the block is not in the form of power of 2, or/and NPT-T may split one block in horizontal direction if height of the block is not in the form of power of 2.
    a. Alternatively, NPT-T may split one block in vertical direction if width of the block is in the form of power of 2, or/and NPT-T may split one block in horizontal direction if height of the block is in the form of power of 2.

6. The above methods may be extended to other Quad-, Senary-, Septenary-, Octonary-Tree partitions (SnT, StT, OctT) wherein one block may be split to 6, 7, or 8 smaller blocks.

7. The coding order (denoted by Pldx 0 . . . (K−1)) may be different from that defined in FIGS. 13A-13C and FIG. 14.
    a. The coding order for one NPT-T pattern may be pre-defined.
    b. Alternatively, multiple coding orders may be pre-defined for one NPT-T pattern, and one block may choose one from them, such as via signalling the indication of selected coding order or derivation at the decoder side.

4.3 Transform Size/Transform Matrix and Transform Region Selection

8. For a child block size with at least one of width ($W_i$) and height ($H_i$) not in the form of pow 2, it is restricted to use a smaller transform block (with width and height denoted by $TW_i$ and $TH_i$, respectively) compared to the child block. That is, it is disallowed if both $TW_i$=$W_i$ and $TH_i$=$H_i$.
    a. In one example, the settings of $TW_i$ and/or $TH_i$ and/or transform matrices may depend on the child block size.
        (a) In one example, $TW_i$ is set to pow(2, floor(log 2($W_i$)).
        (b) In one example, $TH_i$ is set to pow(2, floor(log 2($H_i$)).
    b. In one example, the settings of $TW_i$ and/or $TH_i$ and/or transform matrices may depend on the available transform matrices.
        (a) In one example, $TW_i$ is set to one allowed transform size and/or transform matrices that is in the form of pow of 2, such as the maximumly allowed transform size but no larger than $W_i$.
        (b) In one example, Ta is set to one allowed transform size and/or transform matrices that is in the form of pow of 2, such as the maximumly allowed transform size but no larger than $H_i$.
    c. In one example, the settings of $TW_i$ and/or $TH_i$ and/or transform matrices may depend on the parent block wherein the child block is split from.
    d. In one example, the settings of $TW_i$ and/or $TH_i$ and/or transform matrices may depend on sizes of child blocks split from the same parent block.
    e. In one example, the settings of $TW_i$ and/or $TH_i$ and/or transform matrices may depend on color format and/or color component.
    f. In one example, the settings of $TW_i$ and/or $TH_i$ and/or transform matrices may depend on picture type/slice type/tile group type/low delay check flag.
    g. In one example, the settings of $TW_i$ and/or $TH_i$ and/or transform matrices may depend on other coded information, such as quantization parameters, mode information (intra/inter/combined intra-inter), reference picture information (current picture referencing/uni-prediction/bi-prediction/multiple-hypothesis prediction).
    h. How to define the transform block size and/or transform matrices may be signalled in high level syntax elements, such as SPS/VPS/ in SPS/PPS/VPS/APS/sequence header/picture header/slice header/tile group header/CTU row/regions, etc. al.
    i. In one example, $TW_i$ is no larger than TWmax. For example, TWmax=64.
    j. In one example, $TH_i$ is no larger than THmax. For example, THmax=64.
    k. In one example, $TW_i$ is no smaller than TWmin. For example, TWmin=4.
    l. In one example, $TH_i$ is no smaller than THmin. For example, THmin=4.

Figure 15B:
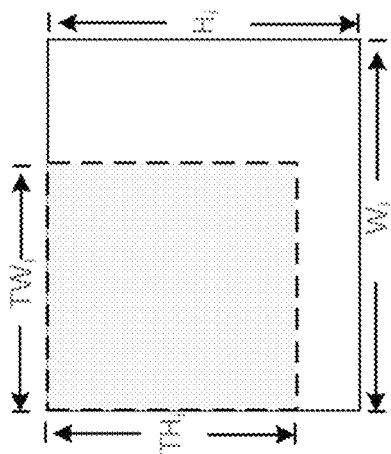
FIG. 15A-15B show examples of (OffsetX, OffsetY) set to (0, 0).
Figure 15A:
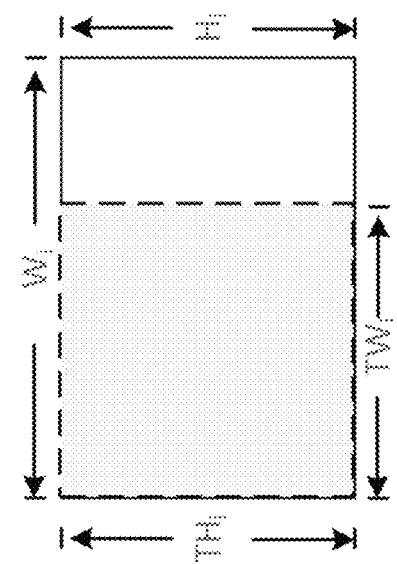

9. When the transform block (with width and height denoted by $TW_i$ and $TH_i$, respectively) is smaller compared to the child block, a fixed offset (OffsetX, OffsetY) may be applied to locate the region where transform shall be applied to.
    a. In one example, (OffsetX, OffsetY) is set to (0, 0). FIG. 15A-15B show some examples. Alternatively, OffsetX is set to 0. Alternatively, OffsetY is set to 0.

FIG. 15A shows the case of Wi≠2N0, Hi=2N1

FIG. 15B shows the case of $W_i \neq 2^{N0}$, $H_i \neq 2^{N1}$

FIGS. 15A-15B show examples of (OffsetX, OffsetY) set to (0, 0) (solid line: child block; dashed line: transform region).

b. Alternatively, only one of OffsetX and OffsetY is set to 0.

c. Alternatively, both OffsetX and OffsetY are unequal to 0.

(a) In one example, OffsetX is set to $(W_i - TW_i)$.

(b) In one example, OffsetY is set to $(H_i - TH_i)$.

Figure 16B:
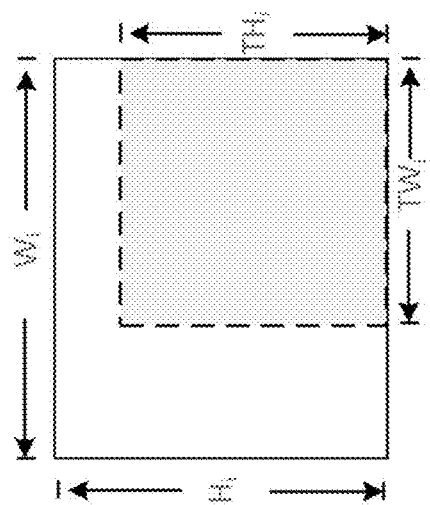
FIG. 16A-16B show another examples of (OffsetX, OffsetY) set to (0, 0).
Figure 16A:
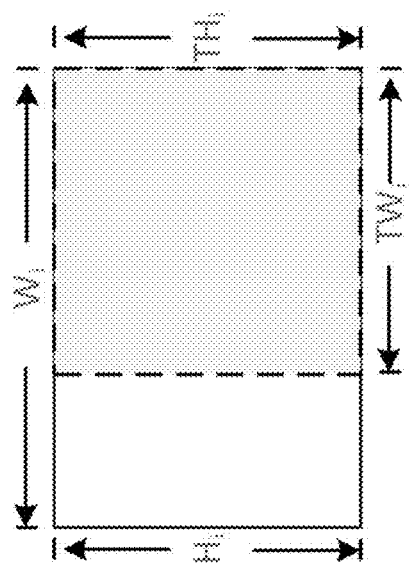

(c) FIGS. 16A-16B show some examples.

FIG. 16A shows an example where $W_i \neq 2^{N0}$, $H_i = 2^{N1}$

FIG. 16B shows an example where Wi≠$2^{N0}$, Hi≠$2^{N1}$

FIGS. 16A-16B show examples of (OffsetX, OffsetY) set to (0, 0) (solid line: child block; dashed line: transform region).

d. OffsetX and/or OffsetY may depend on the child block shape.

e. OffsetX and/or OffsetY may depend on the parent block shape.

f. OffsetX and/or OffsetY may depend on the coded information of the child block/parent block.

g. In one example, the settings of OffsetX and/or OffsetY may depend on color format and/or color component.

h. In one example, the settings of OffsetX and/or OffsetY may depend on picture type/slice type/tile group type/low delay check flag.

i. In one example, the settings of OffsetX and/or OffsetY may depend on other coded information, such as quantization parameters, mode information (intra/inter/combined intra-inter), reference picture information (current picture referencing/uni-prediction/bi-prediction/multiple-hypothesis prediction).

j. In one example, OffsetX and/or OffsetY may be signalled.

k. In one example, several candidates of OffsetX and/or OffsetY may be defined, index of a candidate may be signalled.

(a) In one example, size of the candidate set may depend on the child block shape, and index may be signaled differently for different child block shapes.

(b) If size of the candidate set is equal to 1, no index is signaled.

l. In one example, several candidates of (OffsetX, OffsetY) may be defined, index of a candidate may be signalled to indicate both OffsetX and OffsetY.

(a) In one example, size of the candidate set may depend on the child block shape, and index may be signaled differently for different child block shapes.

(b) If size of the candidate set is equal to 1, no index is signaled.

10. Different from above bullets wherein only one fixed transform size and/or transform matrices is allowed for a child block size with at least one of width ($W_i$) and height ($H_i$) not in the form of pow of 2, it is proposed to allow multiple different transform sizes and/or transform matrices for such kinds of child blocks.

a. In one example, all kinds of allowed transform sizes shall be in the form of pow of 2.

b. Alternatively, at least one allowed transform sizes shall be in the form of pow of 2.

c. In one example, other kinds of transform sizes shall be no larger than that defined in bullet 8.

d. Only one fixed offset (including both OffsetX and OffsetY) that transform region shall be applied may be defined/derived for each of allowed transform size.

(a) In this case, only indications of selected transforms may be signalled.

e. Multiple offsets that transform region shall be applied may be associated with each of allowed transform size.

(a) In this case, indications of selected transforms and offset may be both signalled.

(b) In one example, for all kinds of allowed transform sizes, number of allowed offsets are the same.

(c) Alternatively, number of allowed offsets may be different for different transform size.

f. In one example, indications of all kinds of allowed transform sizes and/or offsets and/or transform matrices may be signalled.

g. Alternatively, the allowed transform sizes and/or transform matrices and/or offsets may be classified into M categories. Category index may be firstly signalled. Alternatively, furthermore, an index to the selected transform size/offsets/matrix may be further signalled.

h. In one example, one index may be signaled to indicate both the transform size and the offset.

4.4 Usage of Non-Power-Two-Partition Tree

11. A block which is split into child blocks by NPT-T, may be split from a parent block by one or some specific kinds of split methods.

a. A block which may allow NPT-T partitions, may be a block generated by QT or BT or TT or NPT-T partitions.

b. For example, a block which is split into child blocks by NPT-T, can only be split from a parent block by QT.

c. A block which may allow NPT-T partitions, may be a root block.

12. A block which is split from a parent block by NPT-T, may be further split into child blocks by one or multiple other partition types (such as QT, BT, TT, NPT-T, UQT).

a. For example, a block which is split from a parent block by NPT-T, may be further split into child blocks by BT and/or TT.

b. For example, a block which is split from a parent block by NPT-T, may be further split into child blocks by BT and/or TT, and/or QUT-T, but not QT.

c. For example, a block which is split from a parent block by NPT-T, may be further split into child blocks by NPT-T and/or QT, but not BT/TT.

d. For example, a block which is split from a parent block by NPT-T, cannot be further split into child blocks by QT.

e. Alternatively, NPT-T split blocks may be not further split into child blocks.

13. When a parent block is split into child blocks by NPT-T, the split depth of the child block may be derived from the split depth of the parent block.

a. In one example, the splitting due to NPT-T may be used to update the QT/BT/TT/NPT-T/MTT depth.

(a) In one example, the QT depth of one or all of the child blocks is equal to the QT depth of the parent block added by 1.

(b) In one example, the BT depth of one or all of the child blocks is equal to the BT depth of the parent block added by 1.
(c) In one example, the TT depth of one or all of the child blocks is equal to the TT depth of the parent block added by 1.
(d) In one example, the NPT-T depth of one or all of the child blocks is equal to the NPT-T depth of the parent block added by 1.
(e) In one example, the MTT depth of one or all of the child block is equal to the MTT depth of the parent block added by 1.
1. For example, the MTT depth of the child block is equal to the MTT depth of the parent block added by 1 if the parent block is split into child blocks by BT.
2. For example, the MTT depth of the child block is equal to the MTT depth of the parent block added by 1 if the parent block is split into child blocks by TT.
b. In one example, the NPT-T/BT/TT/QT/MTT depth increasement for different child block may be different.
(a) The depth increasement is dependent on the ratio of a child block compared to the parent block.
14. The filtering process (such as deblocking filter, SAO, ALF, diffusion filter, bilateral filter) may depend on the NPT-T partitions.
a. In one example, whether/how to filter samples may depend on whether these samples at located at the boundary of one block due to NPT-T splitting.
b. In one example, samples of preceding reconstructed child blocks may be used in diffusion filter or/and bilateral filter.
c. In one example, whether/how to filter samples may depend on whether these samples at located at the boundary of one transform block within a coding unit due to NPT-T splitting.
15. The intra prediction mode or CIIP mode may depend on the NPT-T partitions.
a. In one example, a child block may use preceding reconstructed child blocks for intra prediction in intra prediction mode or CIIP mode.
16. The local illumination compensation (LIC) mode may depend on the NPT-T partitions.
a. In one example, a child block may use preceding reconstructed child blocks for deriving the LIC parameters.

4.5 Restrictions of Usage of NPT-T

17. In one example, the maximum/minimum block size that could allow NPT-T partitions and/or the maximum bit depth and/or maximum depth that could allow NPT-T partitions may be signalled in SPS/PPS/VPS/APS/sequence header/picture header/slice header/tile group header/CTU row/regions, etc. al.
a. The maximum/minimum block size that could allow NPT-T partitions and/or the maximum depth that could allow NPT-T partitions may be derived from other values, such as depth for MTT or depth of QT.
b. The maximum block that allows NPT-T partitions, may be the largest coding block (coding tree block or coding tree unit).
c. For example, the maximum block that allows NPT-T partitions, may be the virtual pipeline data unit (VPDU).
d. In one example, the maximum/minimum block size that could allow NPT-T partitions and/or the maximum depth that could allow NPT-T partitions may be dependent on profile/level/tier of a standard.
e. In one example, the maximum/minimum block size that could allow NPT-T partitions and/or the maximum depth that could allow NPT-T partitions may be derived, such as to be the same as that for QT partitions.
f. In one example, the maximum/minimum block size that could allow NPT-T partitions and/or the maximum depth that could allow NPT-T partitions may be dependent on tile group tile/slice type/color component/dual tree is enabled or not.
g. In one example, the maximum/minimum block size that could allow NPT-T partitions and/or the maximum depth that could allow NPT-T partitions may be different for different NPT-T patterns.
h. When one block is split according to NPT-T, the corresponding depth of NPT-T of one smaller block may be adjusted (e.g., increased by 1) accordingly.
(a) Alternatively, the corresponding depth of a certain partition (e.g., QT) of one smaller block may be adjusted (e.g., increased by 1) accordingly.
(b) Alternatively, the corresponding depth of MTT of one smaller block may be adjusted (e.g., increased by 1) accordingly.
(c) The adjustment of corresponding depth of different smaller blocks may be done in the same way (e.g., increase by 1)
1. Alternatively, the adjustment of corresponding depth of different smaller blocks may be done in the different way (e.g., increase by 1). For example, the adjustment is dependent on block dimension of the smaller block.
18. NPT-T is not allowed if a split child block cross more than one Virtual pipeline data units (VPDUs).
a. Alternatively, NPT-T is still allowed, however, such child block is forced to be further split until no child block crosses more than one VPDU.
19. NPT-T is not allowed if the width/height of the current block (or any of the split child block) satisfy some conditions. (Suppose the width and height of the current block are W and H, T1, T2 and T are some integers)
a. NPT-T is not allowed if W>=T1 and H>=T2;
b. NPT-T is not allowed if W>=T1 or H>=T2;
c. NPT-T is not allowed if W<=T1 and H<=T2;
d. NPT-T is not allowed if W<=T1 or H<=T2;
e. NPT-T is not allowed if W×H<=T;
f. NPT-T is not allowed if W×H>=T;
g. Horizontal NPT-T is not allowed if H<=T; For example, T=16.
h. Horizontal NPT-T is not allowed if H>=T; For example, T=128.
i. Vertical NPT-T is not allowed if W<=T; For example, T=16.
j. Vertical NPT-T is not allowed if W>=T; For example, T=128.
k. T1, T2 and T may be signaled from the encoder to the decoder in VPS/SPS/PPS/picture header/slice header/tile group header/tile header.
l. T1, T2 and T may depend on color components. For example, T1, T2 and T may be different for luma and chroma components.
m. T1, T2 and T may depend on whether luma coding tree and chroma coding tree are separated. For example, T1, T2 and T may be different for luma and chroma components if luma coding tree and chroma coding tree are separated.

n. Alternatively, when the transform is not supported for at least one child block due to NPT-T, NPT-T split is invalid.
o. Alternatively, when the depth of one block exceeding the allowed depth for NPT-T splitting, NPT-T split is invalid.
p. Alternatively, when any of a child block size is smaller than the allowed block size due to NPT-T splitting, NPT-T split is invalid.

20. NPT-T is allowed if the width/height of the current block (or any of the split child block) satisfy some conditions. (Suppose the width and height of the current block are W and H, T1, T2 and T are some integers)
    a. NPT-T is allowed if W>=T1 and H>=T2;
    b. NPT-T is allowed if W>=T1 or H>=T2;
    c. NPT-T is allowed if W<=T1 and H<=T2;
    d. NPT-T is allowed if W<=T1 or H<=T2;
    e. NPT-T is allowed if W×H<=T;
    f. NPT-T is allowed if W×H>=T;
    g. Horizontal NPT-T is allowed if H<=T; For example, T=64.
    h. Horizontal NPT-T is allowed if H>=T; For example, T=32.
    i. Vertical NPT-T is allowed if W<=T; For example, T=64.
    j. Vertical NPT-T is allowed if W>=T; For example, T=32.
    k. T1, T2 and T may be signaled from the encoder to the decoder in VPS/SPS/PPS/picture header/slice header/tile group header/tile header.
    l. T1, T2 and T may depend on color components. For example, T1, T2 and T may be different for luma and chroma components.
    m. T1, T2 and T may depend on whether luma coding tree and chroma coding tree are separated. For example, T1, T2 and T may be different for luma and chroma components if luma coding tree and chroma coding tree are separated.

21. NPT-T is not allowed if the depth of the current block satisfy some conditions. The depth of the current block may refer to QT depth, BT depth, TT depth, NPT-T depth or MTT depth.
    a. NPT-T is not allowed if the split depth<=T;
    b. NPT-T is not allowed if the split depth>=T;
    c. NPT-T is not allowed if the QT split depth<=T;
    d. NPT-T is not allowed if the QT split depth>=T;
    e. NPT-T is not allowed if the BT split depth>=T;
    f. NPT-T is not allowed if the BT split depth<=T;
    g. NPT-T is not allowed if the TT split depth>=T;
    h. NPT-T is not allowed if the TT split depth>=T;
    i. NPT-T is not allowed if the NPT-T split depth<=T;
    j. NPT-T is not allowed if the NPT-T split depth>=T;
    k. NPT-T is not allowed if the MTT split depth<=T;
    l. NPT-T is not allowed if the MTT split depth>=T;
    m. T may be signaled from the encoder to the decoder in VPS/SPS/PPS/picture header/slice header/tile group header/tile header.
    n. T may depend on color components. For example, T1, T2 and T may be different for luma and chroma components.
    o. T may depend on whether luma coding tree and chroma coding tree are separated.

For example, T1, T2 and T may be different for luma and chroma components if luma coding tree and chroma coding tree are separated.

22. NPT-T is allowed if the depth of the current block satisfy some conditions. The depth of the current block may refer to QT depth, BT depth, TT depth, NPT-T depth or MTT depth.
    a. NPT-T is allowed if the split depth<=T;
    b. NPT-T is allowed if the split depth>=T;
    c. NPT-T is allowed if the QT split depth<=T;
    d. NPT-T is allowed if the QT split depth>=T;
    e. NPT-T is allowed if the BT split depth>=T;
    f. NPT-T is allowed if the BT split depth<=T;
    g. NPT-T is allowed if the TT split depth>=T;
    h. NPT-T is allowed if the TT split depth>=T;
    i. NPT-T is allowed if the NPT-T split depth<=T;
    j. NPT-T is allowed if the NPT-T split depth>=T;
    k. NPT-T is allowed if the MTT split depth<=T;
    l. NPT-T is allowed if the MTT split depth>=T;
    m. T may be signaled from the encoder to the decoder in VPS/SPS/PPS/picture header/slice header/tile group header/tile header.
    n. T may depend on color components. For example, T1, T2 and T may be different for luma and chroma components.
    o. T may depend on whether luma coding tree and chroma coding tree are separated.

For example, T1, T2 and T may be different for luma and chroma components if luma coding tree and chroma coding tree are separated.

23. Whether and how to use NPT-T may depend on the position of the current block. For example, whether and how to use NPT-T may depend on the whether the current block crosses the picture/tile/tile group border or not.
    a. In one example, vertical NPT-T is not allowed if the current block crosses the picture/tile/tile group bottom border.
    b. In one example, horizontal NPT-T is not allowed if the current block crosses the picture/tile/tile group bottom border.
    c. In one example, vertical NPT-T is not allowed if the current block crosses the picture/tile/tile group right border.
    d. In one example, horizontal NPT-T is not allowed if the current block crosses the picture/tile/tile group right border.
    e. In one example, mixed NPT-T may be not allowed if the current block crosses the picture/tile/tile group right border.
    f. In one example, mixed NPT-T may be not allowed if the current block crosses the picture/tile/tile group bottom border.
    g. In one example, if a child block split by NPT-T is totally out of the picture/tile/tile group, the child block may be omitted in the encoding/decoding process.
    h. In one example, if a child block split by NPT-T is partially out of the picture/tile/tile group, the following may apply
        (a) The part out of the picture may be omitted in the encoding/decoding process.
        (b) The part inside the picture may be further split.
        (c) The part inside the picture may be coded as a CU.
            1. Whether the part inside the picture is coded as a CU may depend on the width (w) and height (h) of the part.
                i. In one example, the part inside the picture may be coded as a CU if $w=2^{nw}$, $h=2^{nh}$, where nw and nh are integers.

i. In one example, if any child block split by NPT-T is partially/fully out of the picture/tile/tile group, NPT-T is disallowed.
24. When NPT-T or certain NPT-T pattern is disallowed, the signalling of indication of the usage of the pattern may be also skipped.
   a. Alternatively, it may be still signaled but is constrained to be false in a conformance bitstream.
25. When a child block is split from NPT-T, the child block may not be allowed to be further split with one or more splitting methods as:
   a. QT
   b. horizontal BT
   c. vertical BT
   d. horizontal TT
   e. vertical BT
   f. horizontal UQT
   g. vertical UQT
   h. NPT-T
26. NPT-T is disallowed for a root node.
   a. In one example, NPT-T may be allowed for a leaf node. Alternatively, furthermore, signalling of indications of further splits according to other partitions are skipped.
27. It is proposed to NPT-T may be only applied to the leaf nodes, i.e., when one block is not further split according to other partitions.
   a. In one example, a flag may be signalled for the leaf node whether to use NPT-T or not.
      (a) Alternatively, furthermore, indications of which kind NPT-T may be further signalled.
   b. Alternatively, indications of disabling NPT-T or which kind NPT-T may be signalled for the leaf node.
28. For certain dimensions of one block, if it selects NPT-T to further split it to multiple child blocks, all of the child blocks may share the same merge list.
   a. Alternatively, all of the child blocks may share the same code mode (e.g., intra or inter).
   b. Alternatively, all of the child blocks may share the same AMVP or other kinds of motion candidate lists.
   c. Alternatively, all of the child blocks may share the same cross-component linear model (CCLM)/localize illumination compensation (LIC) parameters or other parameters derived at the decoder side.

4.6 Indications of Usage of NPT-T

29. Whether to apply NPT-T and/or which kind NPT-T is applied may be signaled from encoder to decoder.
   a. In one example, it may be signaled in VPS/SPS/PPS/sequence header/picture header/slice header/tile group header/tile header to indicate whether NPT-T can be applied.
   b. In one example, it may be signaled in VPS/SPS/PPS/sequence header/picture header/slice header/tile group header/tile header to indicate which kinds of NPT-T can be applied.
   c. In one example, it may be signaled in a block to indicate whether NPT-T is used to split that block.
   d. In one example, it may be signaled in a block to indicate which kind of NPT-T is used to split that block.
   e. In one example, different NPT-T sets may be designed for different block shapes/sizes.
   f. In one example, different NPT-T sets may be designed for pictures/tiles/slices with different temporal layers.
   g. In one example, whether or how to apply NPT-T may depend on the video resolution/picture resolution/coded modes/video characteristics (screen content or camera captured sequence or mixed content)/slice type/picture type/tile group type/low delay check flag.
30. One syntax element may be signalled to indicate no split or partition (including partition tree type and split directions).
   a. Alternatively, one syntax element may be firstly signalled to indicate whether to split or not; and another syntax element may be signalled to indicate the partition.
31. Indication of partition may be represented by two syntax element: selected partition tree type may be firstly signalled, followed by splitting direction if needed.
   a. In one example, an index of partition tree type may be signaled in a block to indicate whether a block is split by QT, or NPT-T or non-split.
      (a) Alternatively, furthermore, the splitting direction (horizontal/vertical/mixed direction) and/or splitting patterns may be further signalled.
   h. In one example, an index of partition tree type may be signaled in a block to indicate whether a block is split by BT, or TT, or NPT-T.
      (a) For example, this index may be conditionally signaled, such as only when at least one of BT, TT and NPT-T is valid for this block.
      (b) Alternatively, furthermore, the splitting direction (horizontal/vertical) and/or splitting patterns may be further signalled.
   i. Alternatively, indication of splitting direction may be firstly signalled, followed by partition tree type (such as QT, TT, NPT-T).
      (a) In one example, a flag is signaled in a block to indicate whether a block is vertical split or horizontal split. The vertical split may be BT vertical split, TT vertical split or NPT-T vertical split. The horizontal split may be BT horizontal split, TT horizontal split or NPT-T horizontal split.
      (b) For example, this flag is signaled only when the block is split by BT, or TT, or NPT-T.
      (c) For example, this flag is signaled only when both vertical split and horizontal split are valid for this block.
         1. If only vertical split is valid, the flag is not signaled, and horizontal split is inferred to be used.
         2. If only horizontal split is valid, the flag is not signaled, and vertical split is inferred to be used.
   j. In one example, a binarized code is signaled in a block to indicate which kind of split (BT, TT, or a kind of NPT-T) is used. In following examples, X represents 0 or 1 and Y=~X (Y=1 if X=0 and Y=0 if X=1).
      (a) In one example, the candidate BT, TT or NPT-Ts to be signaled are all vertical splits or horizontal splits depending on previously signaled or derived information.
      (b) In one example, a first flag is signaled to indicate whether NPT-T is used. For example, the binarized codewords orderly to represent BT, TT, NPT-T 1, NPT-T 2, NPT-T 3 and NPT-T 4 are XX, XY, YXX, YXY, YYX, YYY.
      (c) In one example, truncated unary code is applied. For example, the binarized codewords orderly to represent BT, TT, NPT-T 1, NPT-T 2, NPT-T 3 and NPT-T 4 are X, YX, YYX, YYYX, YYYYX, YYYYY.
   (d) In one example, a first flag is signaled to indicate whether BT is used. If BT is not used, then a second flag is signaled to indicate whether NPT-T is used. If NPT-T is used, which kind of NPT-T is used is further signaled. For example, the binarized codewords orderly to represent BT, TT, NPT-T 1, NPT-T 2, NPT-T 3 and NPT-T 4 are X, YX, YYXX, YYXY, YYYX, YYYY.
32. In one example, how to signal which kind of partitions is used in a block may depend on which kinds of partitions (including partition tree type and/or partition directions) are valid for the block. In following examples, X represents 0 or 1 and Y=~X (Y=1 if X=0 and Y=0 if X=1).
   a. In one example, the candidate BT, TT or NPT-T s to be signaled are all vertical splits or horizontal splits depending on previously signaled or derived information.
   b. For example, the non-allowed or invalid split cannot be signaled from the encoder to the decoder, i.e. there is no codeword to represent the non-allowed or invalid split.
   c. In one example, if there is only one kind of split from BT, TT and NPT-T s is valid, then the binarized code to indicate which kind of split (BT, TT, or a kind of NPT-T) is used is not signaled.
   d. In one example, if there are only two kinds of split from BT, TT and NPT-T s are valid, then a flag is signaled to indicate which one of the two valid splits is used.
   e. In one example, the code to indicate which kind of split (BT, TT, or a kind of NPT-T) is binarized as a truncated unary code.
      (a) For example, the maximum value of the truncated unary code is N−1, where N is the number of valid splits (BT, TT and NPT-T s).
      (b) For example, no codeword represents an invalid split. In other words, the invalid split is skipped when building the codeword table.
   f. In one example, if no NPT-T is valid, the flag indicating whether NPT-T is used is not signaled and inferred to be false. For example, the binarized codewords orderly to represent BT and TT are X and Y.
   g. In one example, if only one kind of NPT-T is valid and NPT-T is signaled to be used, then no further information is signaled to indicate which NPT-T is used. The valid NPT-T is used implicitly.
   h. In one example, if only two kinds of NPT-T are valid and NPT-T is signaled to be used, then a flag is signaled to indicate which NPT-T is used.
   i. In one example, if only three kinds of NPT-T are valid and NPT-T is signaled to be used, then a message is signaled to indicate which NPT-T is used. For example, the binarized codewords orderly to represent the three NPT-T s are X, YX, YY.
   j. In one example, the binarization and/or signaling method is not changed according to which kinds of split is valid in the block. An invalid split cannot be chosen in a conformance bit-stream.
33. Indications of partition may be coded by arithmetic coding with one or multiple contexts.
   a. In one example, only partial bins of a bin string may be coded with contexts and remaining bins may be coded with bypass mode (i.e., no context is utilized).
   b. Alternatively, all bins of a bin string may be coded with contexts.
   c. Alternatively, all bins of a bin string may be coded with bypass mode.
   d. For a bin coded with context, one or multiple contexts may be used.
   e. The context may depend on:
      (a) The position or index of the bin.
      (b) The partitioning of spatial/temporal neighbouring blocks.
      (c) The current partition depth (e.g., QT depth/BT depth/TT depth/NPT-T depth/MTT depth) of current block.
      (d) The partition depth (e.g., QT depth/BT depth/TT depth/NPT-T depth/MTT depth) of spatial/temporal neighbouring blocks and/or spatial/temporal non-adjacent blocks.
      (e) The coding modes of spatial/temporal neighbouring blocks.
      (f) The width/height of spatial/temporal neighbouring blocks.
      (g) The width/height of the current block
      (h) Slice types/picture types/tile group type
      (i) Color component
      (j) Statistical results of partition types from previously coded blocks
34. Whether and/or how to use NPT-T may depend on color format (such as 4:4:4 or 4:2:0) and/or color components.
   a. Whether and how to use NPT-T may depend on whether luma and chroma coding trees are separated.
   b. In one example, NPT-T can only be applied on luma component when luma and chroma coding trees are separated.
35. The above methods may be also applicable to SnT, StT, OctT, UQT.

Figure 17:
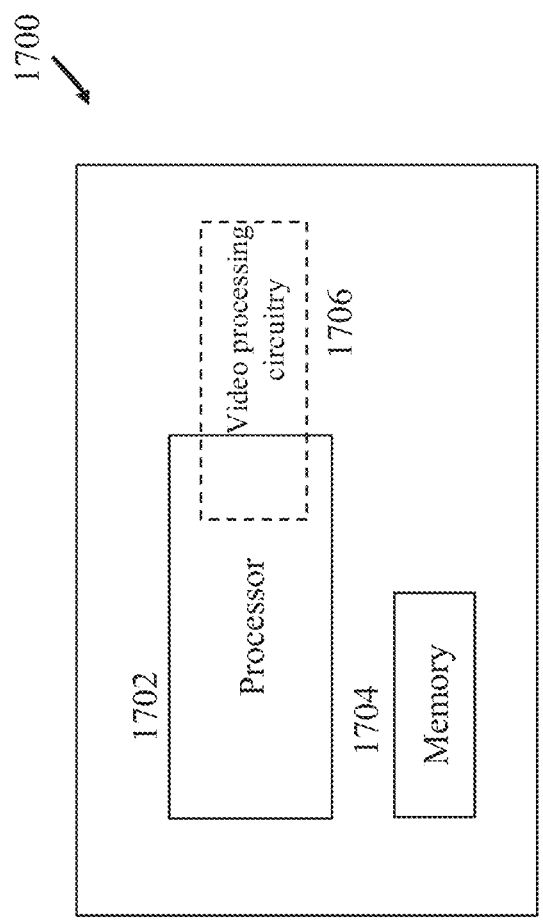
FIG. 17 shows an example of a hardware platform for implementing a technique described in the present document.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing circuitry or hardware 1706 may be used to implement, in hardware circuitry, some techniques described in the present document, and may be partly or completely be a part of the processors 1702 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that several techniques have been disclosed that will benefit video encoder and decoder embodiments incorporated within video processing devices such as smartphones, laptops, desktops, and similar devices by allowing the use of the techniques disclosed in the present document.

Figure 18:
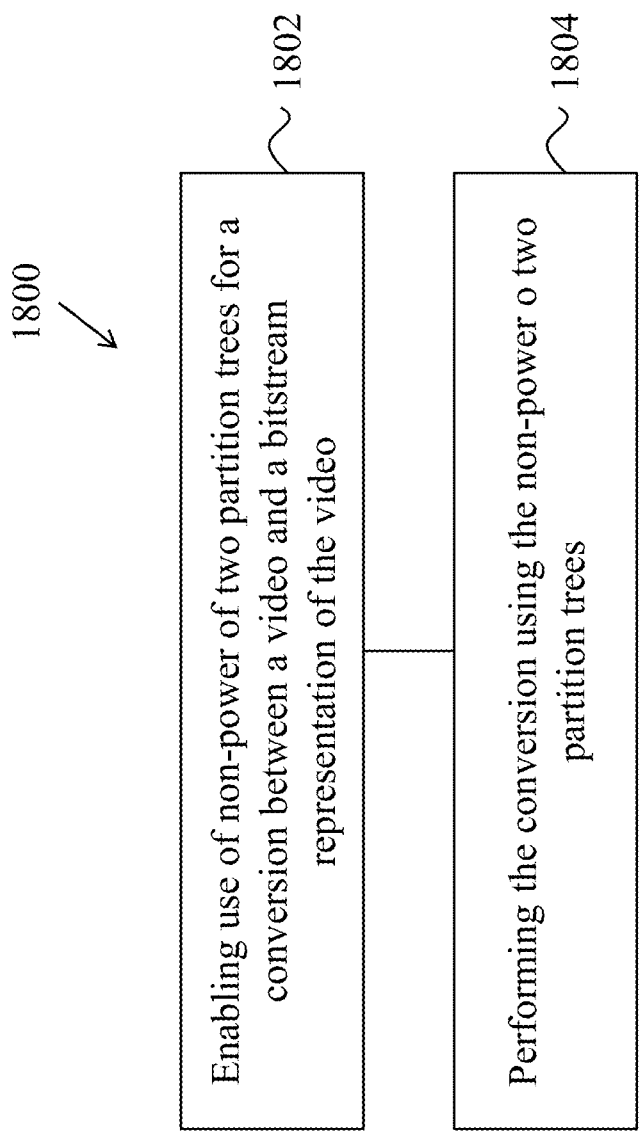
FIG. 18 is a flowchart for an example method of video processing.

FIG. 18 is a flowchart for an example method 1800 of video processing. The method 1800 includes, at 1802, enabling a use of non-power-of-two partition trees (NPT-T) for a conversion between a video and a bitstream representation of the video, wherein the NPT-T includes splitting a video block to one or more smaller sized child blocks of the video block and at least one child block's width or height having a pixel dimension that is a non-power-of-two integer. The method 1800 includes, at 1804, performing the conversion using the NPT-T.

Some embodiments may be described using the following clause-based format.

1. A method of video processing, comprising: enabling a use of non-power-of-two partition trees (NPT-T) for a conversion between a video and a bitstream representation of the video, wherein the NPT-T includes splitting a video block to one or more smaller sized child blocks of the video block and at least one child block's width or height having a pixel dimension that is a non-power-of-two integer; and performing the conversion using the NPT-T.

2. The method of clause 1, wherein the enabling is signaled in the bitstream representation by a field that is included at a sequence parameter set level, a video parameter set level, a sequence header level, a picture parameter set level, a slice header level, a coding unit level, a tile group level, or a coding tree unit row level.

3. The method of any of clauses 1-2, wherein the child blocks are treated as a coding unit or a prediction unit or a transform unit for the conversion.

4. The method of any of clauses 1-3, wherein the video block is W pixels wide and H pixels high and wherein the child blocks are Wi pixels wide and Hi pixels high, where W, H, and Wi, Hi are all integers, and wherein i is an integer variable with values between 0 and K−1, where K represents a number of the child blocks.

5. The method of any of clauses 1-4, wherein the conversion uses the child blocks by recursively partitioning the child blocks into smaller blocks of coding units, prediction units or transform units according to the NPT-T.

6. The method of any of clauses 4-5, wherein at least some of Wi, Hi are non-power-of-two integers.

7. The method of any of clauses 4-5, wherein at least some of Wi, Hi are power-of-two integers.

8. The method of any of clauses 4-7, wherein:
(1) Wi is equal to 2floor (log 2(W/K)), or
(2) Hi is equal to 2floor (log 2(H/K)), or
(3) Wi may be different from Wj if i is not equal to j, or
(4) Hi may be different from Hj if i is not equal to j.

9. The method of clause 4, wherein the child blocks are split along only a specific orientation direction.

10. The method of clause 9, wherein the orientation direction is a vertical direction.

11. The method of clause 9, wherein the orientation direction is a horizontal direction.

12. The method of clause 10, wherein such that Hi=H (for i being 0 . . . (K−1)).

13. The method of clause 11, wherein such that Wi=W (for i being 0 . . . (K−1)).

14. The method of any of clauses 4-13, wherein L0 partitions representing child blocks, where L0 is an integer between 2 and K share a same partition size, with remaining child blocks having different partition sizes.

15. The method of clause 14, wherein the same partition size is floor(W/K) or floor(H/K)

16. The method of clauses 14-15, wherein the L0 partitions are neighboring each other.

17. The method of clauses 14-15, wherein at least some of the L0 partitions are non-neighboring partitions.

18. The method of clauses 14-15, wherein at least some of the L0 partitions are identified by consecutive indexes in the bitstream representation and sequentially processed during the conversion.

19. The method of clause 10, wherein the partition sizes of the remaining child blocks are same.

20. The method of any of clauses 1 to 19, wherein a coding order of the current block and the child blocks is implicitly defined based on a rule.

21. The method of any of clauses 1 to 19, wherein a coding order of the current block and the child blocks is specified in the bitstream representation.

Sections 4.1, 4.2 and 4.3 provide additional details and embodiments of clauses 1-21.

22. A method of video processing, comprising:
applying a transform size restriction for a conversion between a child video block and a bitstream representation of the child video block, wherein the child is split from a video block and has a pixel dimension that is a non-power-of-two (NPT) integer; and
performing the conversion using the transform size restriction.

23. The method of clause 22, wherein the video block is W pixels wide and H pixels high and wherein the child blocks are Wi pixels wide and Hi pixels high, where W, H, and Wi, Hi are all integers, and wherein i is an integer variable with values between 0 and K−1, where K represents a number of the child blocks split from the video block.

24. The method of any of clauses 22-23, wherein the transform size restriction specifies that a given child block for which at least Wi and a height Hi is an NPT integer uses a smaller transform size represented with a width TWi and a height THi.

25. The method of clause 24, wherein TWi or THi depend on a size of the given child block.

26. The method of clause 25, wherein:
(a) TWi is equal to pow(2, floor(log 2(Wi)), or
(b) THi is equal to pow(2, floor(log 2(Hi)).

27. The method of clause 24, wherein TWi or THi depend on a size of a transform matrix used for the conversion.

28. The method of clause 27, wherein the size of the transform matrix is a power of 2:
TWi is equal to the size of the transform size that is a maximumly allowed transform size not exceeding Wi or
THi is equal to the transform size that is a maximumly allowed transform size not exceeding Hi.

29. The method of clause 24, wherein TWi or THi or a transform size depend on:
a type or a position of the video block, or
sizes of child blocks split from the video block, or
a color format or a color component type of the video block, or
a picture type, a slice type, a tile group type, or a low delay check flag in the bitstream representation, or
other coded information in the bitstream representation including quantization parameters, mode information, or reference picture information, including current picture referencing or uni-prediction or bi-prediction or multiple-hypothesis prediction.

30. The method of any of clauses 22 to 29, wherein the transform size restriction specifies to apply transform to a partial of the child block using a fixed X offset or a fixed Y offset.

31. The method of clause 30, wherein the fixed X offset or the fixed Y offset is a function of a shape of the child block or a shape of the video block.

32. The method of clause 22, wherein the transform size restriction permits use of multiple transform sizes during the conversion.

33. The method of clause 32, wherein the multiple transform sizes are power-of-two transform sizes.

34. The method of clause 32, wherein at least one transform size from the multiple transform sizes is a power-of-two size.

Sections 4.3 and 4.4 provide additional examples and embodiments of clauses 22 to 34.

35. A method of video processing, comprising:
applying, selectively based on a usage rule for using a non-power-of-two tree (NPT-T) splitting of a video block for a conversion between the video block and a bitstream representation of the video block, the video block or one or more smaller sized child blocks of the video have a pixel dimension that is a non-power-of-two (NPT) integer; and
performing the conversion using the usage rule.

36. The method of clause 5, wherein the usage rule specifies to use the NPT-T only in cases that the video block is split from a parent block using quadtree or binary tree or ternary tree or NPT-T partitioning.

37. The method of clause 35, wherein the usage rule specifies to use the NPT-T only in cases that the video block is split from a parent block using quadtree partitioning.

38. The method of clause 35, wherein the usage rules disables using NPT-T in case that the video block is a root block.

39. The method of any of clauses 35 to 38, wherein the one or more smaller sized blocks are obtained using a partitioning scheme that depends on partitioning type of the current block.

40. The method of any of clauses 35 to 39, wherein a split depth of the one or more smaller sized blocks is dependent on a split depth of the current block.

41. The method of any of clauses 35 to 39, wherein split depths of at least some of the one or more smaller sized blocks are different.

42. The method of clause 35, wherein the usage rule specifies a filtering process applied to the one or more smaller blocks and the video block.

43. The method of clause 42, wherein the filtering process depends on pixel positions in the current block or the one or more child blocks using borders created by the NPT-T.

44. The method of any of clauses 42-43, wherein the filtering process includes a deblocking filter or a sample adaptive offset filter or an adaptive loop filter or a diffusion filter or a bilateral filter.

45. The method of any of clauses 42-44, wherein the usage rule specifies to use samples of a previously reconstructed child block for diffusion filtering or bilateral filtering of samples of a current child block.

46. The method of clause 35, wherein the usage rule specifies selective application of an intra prediction mode or a local illumination compensation mode or combined inter-intra partitioning applied to the one or more smaller blocks and the video block.

47. The method of clause 35, wherein the usage rule disables use of NPT-T for the video block in case that a size of the video block is above a maximum threshold.

48. The method of clause 35, wherein the usage rule disables use of NPT-T for the video block in case that a size of the video block is below a minimum threshold.

49. The method of clause 35, wherein the usage rule disables use of NPT-T for the video block in case that a bit depth of the video block is above a maximum bit depth or below a minimum bit depth.

50. The method of any of clauses 47-49, wherein the usage rule disabling is signaled in a field in the bitstream representation that is included at a sequence parameter set level, a video parameter set level, a sequence header level, a picture parameter set level, a slice header level, a coding unit level, a tile group level, or a coding tree unit row level.

51. The method of any of clauses 47-49, wherein the usage rule disabling is derived from a parameter of the video block.

52. The method of clause 51, wherein the parameter of the current block is a partition tree depth of the video block or a profile of the bitstream representation or a level of the bitstream representation or a tier or a layer of the bitstream representation.

53. The method of clause 51, wherein the parameter of the video block is based on maximum or minimum sizes allowed in quadtree partitioning of neighboring blocks of the video block.

54. The method of clause 35, wherein the usage rule specifies disabling use of the NPT-T for the conversion of the video block or a child block of the video block that crosses more than one virtual pipeline data units.

55. The method of clause 35, wherein the video block crosses more than one virtual pipeline data units and the usage rule specifies to split the video block into child blocks until no child block crosses more than one virtual pipeline data units.

56. The method of clause 35, wherein the usage rule disables use of the NPT-T along a horizontal or a vertical direction in case that a height H or a width W of the video block satisfies a condition.

57. The method of clause 56, wherein the condition includes:
W>=T1 and H>=T2;
W>=T1 or H>=T2;
W<=T1 and H<=T2;
W<=T1 or H<=T2;
W×H<=T; or
W×H>=T, where W, H, are integers and T, T1, T2 are rational numbers.

58. The method of clause 35, wherein the usage rule disables use of the NPT-T along the horizontal direction in case that a height H or a width W of the video block as:
(a) Horizontal NPT-T is not allowed if H<=T,
(b) Horizontal NPT-T is not allowed if H>=T,
(c) Vertical NPT-T is not allowed if W<=T, or
(d) vertical NPT-T is not allowed if W>=T, where W, H and T are integers.

59. The method of clause 35, wherein the usage rule disables use of the NPT-T along a horizontal or a vertical direction unless the video block satisfies a condition.

60. The method of clause 59, wherein the condition includes:
W>=T1 and H>=T2;
W>=T1 or H>=T2;
W<=T1 and H<=T2;
W<=T1 or H<=T2;
W×H<=T;
W×H>=T;
Horizontal NPT-T is allowed if H<=T;
Horizontal NPT-T is allowed if H>=T;
Vertical NPT-T is allowed if W<=T; or
Vertical NPT-T is allowed if W>=T; where W, H, T, T1 and T2 are positive rational numbers.

Sections 4.3 to 4.5 provide additional examples and embodiments of clauses 35 to 60.

61. A method of video processing, comprising:
applying, selectively based on a use indication, a non-power-of-two tree (NPT-T) splitting of a video block for a conversion between the video block and a bitstream representation of the video block, wherein the video block or one or more smaller sized child blocks of the video have a pixel dimension that is a non-power-of-two (NPT) integer; and
performing the conversion corresponding to the use indication.

62. The method of clause 61, wherein the use indicatin is signaled in the bitstream representation at a video parameter set level or a sequence parameter set level or a picture parameter set level or a sequence header level or a picture header level or a tile group header level or a tile header level.

63. The method of any of clauses 61-62, wherein the use indication indicates a type of partitioning used for the NPT-T splitting.

64. The method of clause 3, wherein the type of partitioning is dependent on a type of the video block.

65. The method of any of clauses 61 to 64, wherein the use indication depends on at least one of: a video resolution a picture resolution, coded modes, video characteristics, a slice type, a picture type, a tile group type, or a low delay check flag associated with the video block.

66. The method of any of clauses 61-65, wherein the use indication includes multiple syntax elements.

67. The method of clause 66, wherein a first syntax element of the multiple syntax elements corresponds to a partition tree type and a second syntax element corresponds to a splitting direction.

68. The method of clause 67, wherein the first syntax element occurs in the bitstream representation before the second syntax element.

69. The method of clause 67, wherein the first syntax element occurs in the bitstream representation after the second syntax element.

70. The method of any of clauses 61-69, wherein the use indication uses a binarized code.

71. The method of clause 70, wherein the use indication uses context-based arithmetic coding of the binarized code based on bins of the binarized code.

72. The method of clause 71, wherein the context-based arithmetic coding uses a context that depends on: a position or an index of a bin, or a partitioning of a spatially or temporally neighboring block of the video block or a current partition depth of the video block or a partition depth of the spatially or temporally neighboring blocks.

73. The method of any of clauses 61-72, wherein the use indication further is based on a color format or a color component associated with the video block.

74. The method of any of clauses 1-73, wherein the conversion includes generating pixel values of the video block from the bitstream representation or the bitstream representation from the video block.

Section 4.6 provides additional details and embodiments of clauses 61-74.

75. A video decoding apparatus comprising a processor, configured to implement a method recited in one or more of clauses 1-74.

76. A video encoding apparatus comprising a processor, configured to implement a method recited in one or more of clauses 1-74.

77. A computer-readable medium having code stored thereon, the code, when executed, causing a processor to implement method recited in one or more of clauses 1-74.

Figure 19:
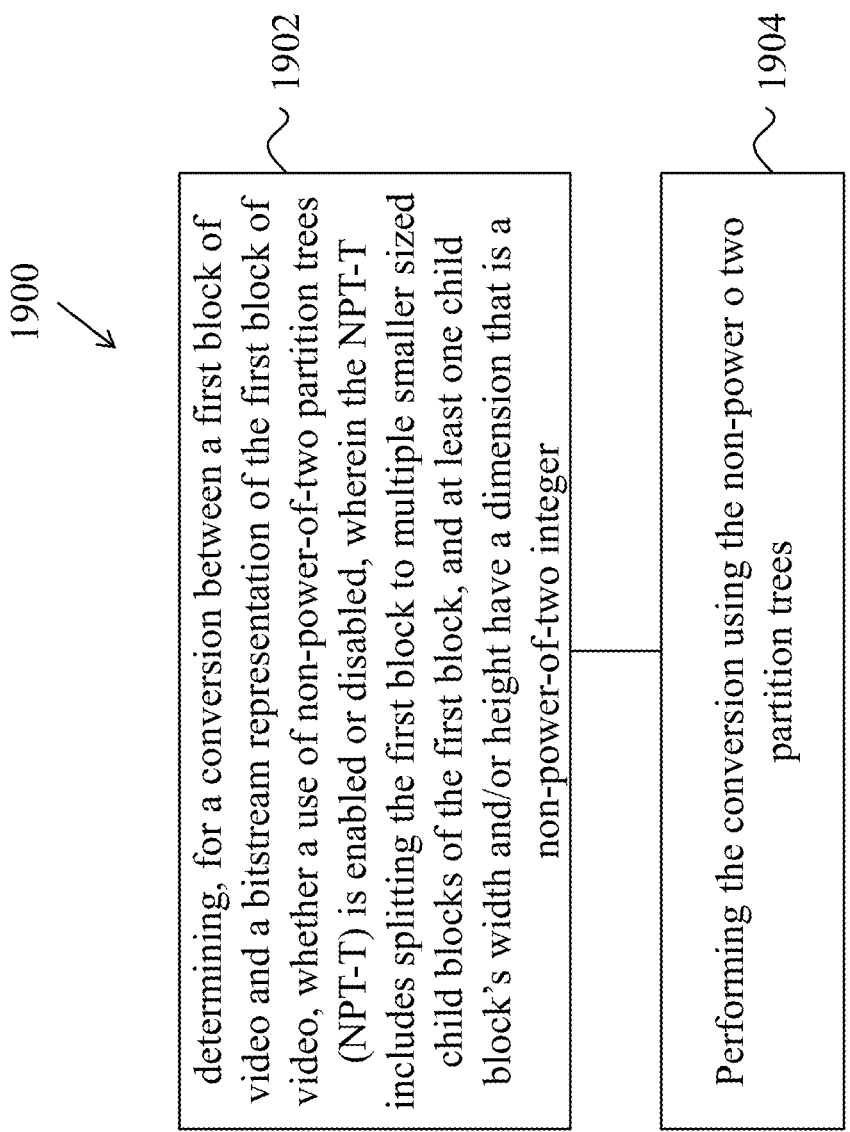
FIG. 19 is a flowchart for an example method of video processing.

FIG. 19 is a flowchart for an example method 1900 of video processing. The method 1900 includes, determining (1902), for a conversion between a first block of video and a bitstream representation of the first block of video, whether a use of non-power-of-two partition trees (NPT-T) is enabled or disabled, wherein the NPT-T includes splitting the first block to multiple smaller sized child blocks of the first block, and at least one child block's width and/or height have a dimension that is a non-power-of-two integer; and performing (1904) the conversion based on the NPT-T in response to the determination that the NPT-T is enabled.

In some examples, the method further comprises: the determination is based on a field present in the bitstream representation.

In some examples, the method further comprises: the field is an indication of partition tree type from a set of partition tree types which comprises at least one of NPT-T, quarter-tree (QT) or binary-tree (BT) or ternary-tree (TT); or an indication of usage of NPT-T.

In some examples, in response to the determination that the NPT-T is enabled, the first block is directly split into the multiple child blocks.

In some examples, at least one of the child blocks is a leaf node which is treated as a coding unit or a prediction unit or a transform unit for the conversion.

In some examples, the first block is W pixels wide and H pixels high and wherein the child blocks are $W_i$ pixels wide and $H_i$ pixels high, where W, H, and $W_i$, $H_i$ are all integers, and wherein i is an integer variable with values between 0 and K−1, where K represents a number of the child blocks.

In some examples, the child blocks are further split into even smaller blocks in a recursive way.

In some examples, K>2.

In some examples, at least one $W_i$ or $H_i$ is non-power-of-two integer.

In some examples, at least one $W_i$ or $H_i$ is power-of-two integer.

In some examples,
(1) $W_i$ is equal to $2^{floor(log\ 2(W/K))}$ or
(2) $H_i$ is equal to $2^{floor(log\ 2(H/K))}$, or
(3) $W_i$ is different from $W_j$ if i is not equal to j, or
(4) $H_i$ is different from $H_j$ if i is not equal to j,
where i and j are integers variable with values between 0 and K−1, wherein i is an integer variable with values between 0 and K−1, and function floor (x) returns the greatest integer less than or equal to x.

In some examples, at least one $W_i$ is set to floor($W*m/2^n$), where $W>=2^n$ and $1<=m<2^n$.

In some examples, at least one $H_i$ is set to floor($H*m/2^n$) wherein $H>=2^n$ and $1<=m<2^n$.

In some examples, one or more of the child blocks are further split into even smaller blocks according to the NPT-T.

In some examples, the first block whose width or height is non-power-of-two integer cannot be split according to NPT-T.

In some examples, the first block whose width is unequal to height cannot be split according to NPT-T.

In some examples, the first block is split only in one of vertical direction and horizontal direction.

In some examples, when the first block is split in the vertical direction, $H_i=H$, where i being 0 to (K−1).

In some examples, when the first block is split in the horizontal direction, $W_i=W$, where i being 0 to (K−1).

In some examples, $L_0$ child blocks of the multiple chid blocks, where $L_0$ is an integer between 2 and K, share a same partition size.

In some examples, the width of the same partition size is floor(W/K), or the height of the same partition size is floor(H/K).

In some examples, the $L_0$ child blocks are neighboring each other.

In some examples, at least one of the $L_0$ child blocks are non-neighboring child blocks.

In some examples, the $L_0$ child blocks are identified by consecutive indexes which indicate the processing order during the conversion.

In some examples, $L_1$ child blocks of the remaining (K−$L_0$) child blocks, where $L_1$ is an integer between 1 and K−$L_0$, share a second same partition size.

In some examples, the width of the second same partition size is ((W−$L_0$*floor (W/K))/(K−$L_0$)), or the height of the same partition size is ((H−$L_0$*floor (H/K))/(K−$L_0$)).

In some examples, when $L_1$ is equal to (K−$L_0$−1), one left child block is assigned with block width equal to W−$L_0$*floor(W/K)−(W−$L_0$*floor (W/K))/(K−$L_0$))*(K−$L_0$−1), or one top child block is assigned with block height equal to H−$L_0$*floor(H/K)−((H−$L_0$*floor (H/K))/(K−$L_0$))*(K−$L_0$−1).

In some examples, the remaining (K−$L_0$) child blocks are assigned with different partition sizes.

In some examples, the $L_1$ child blocks are neighboring each other.

In some examples, at least one of the $L_1$ child blocks are non-neighboring child blocks.

In some examples, the $L_1$ child blocks are identified by consecutive indexes which indicate the processing order during the conversion.

In some examples, the $L_1$ child blocks are identified by non-consecutive indexes which indicate the processing order during the conversion.

In some examples, only one child block has a partition size ($W_i \times H_i$) different from that of all the remaining child blocks.

In some examples, all the child blocks have the same partition size ($W_i \times H_i$).

In some examples, the first block is split in both of vertical direction and horizontal direction.

In some examples, at least one of $W_i$ is unequal to W and/or at least one of $H_i$ is unequal to H.

In some examples, the first block is split in vertical direction if width of the first block is a non-power-of-two integer, or/and the first block is split in horizontal direction if height of the first block is a non-power-of-two integer.

In some examples, the first block is split in vertical direction if width of the first block is a power-of-two integer, or/and the first block is split in horizontal direction if height of the first block is a power-of-two integer.

In some examples, the multiple child blocks include 6, 7, or 8 child blocks.

In some examples, a coding order is pre-determined for one NPT-T pattern.

In some examples, multiple coding orders is pre-determined for one NPT-T pattern.

In some examples, one of the multiple coding orders is chosen for the first block via signaling an indication of selected coding order or derivation at decoder side.

In some examples, when the first block allows the NPT-T, the first block is split from a parent block by one or more specific kinds of split methods.

In some examples, when the first block allows the NPT-T, the first block is split from the parent block by quarter-tree (QT) or binary-tree (BT) or ternary-tree (TT) or NPT-T partitions.

In some examples, when the first block allows the NPT-T, the first block can only be split from the parent block by quarter-tree (QT).

In some examples, when the first block allows the NPT-T, the first block is a root block.

In some examples, the child blocks can be further split into child blocks by one or multiple other partition types.

In some examples, the child block can be further split into child blocks by BT and/or TT.

In some examples, the child block can be further split into child blocks by BT and/or TT, and/or QUT-T, but not QT.

In some examples, the child block can be further split into child blocks by NPT-T and/or QT, but not BT or TT.

In some examples, the child block cannot be further split into child blocks by QT.

In some examples, the child block cannot be further split into child blocks.

In some examples, when the first block is split into the multiple child blocks by NPT-T, the split depth of the child block is derived from the split depth of the first block.

In some examples, the splitting due to NPT-T is used to update the at least one of QT, BT, TT, NPT-T or Multiple type trees (MTT) depth.

In some examples, the QT depth of one or all of the child blocks is equal to the QT depth of the first block added by 1.

In some examples, the BT depth of one or all of the child blocks is equal to the BT depth of the first block added by 1.

In some examples, the TT depth of one or all of the child blocks is equal to the TT depth of the first block added by 1.

In some examples, the NPT-T depth of one or all of the child blocks is equal to the NPT-T depth of the first block added by 1.

In some examples, the MTT depth of one or all of the child block is equal to the MTT depth of the first block added by 1.

In some examples, the MTT depth of the child block is equal to the MTT depth of the first block added by 1 if the first block is split into child blocks by BT.

In some examples, the MTT depth of the child block is equal to the MTT depth of the first block added by 1 if the first block is split into child blocks by TT.

In some examples, the NPT-T or BT or TT or QT or MTT depth increasement for different child block is different.

In some examples, the depth increasement is dependent on the ratio of a child block compared to the first block.

In some examples, filtering process depends on the NPT-T partitions, where the filtering process is associated with at least one of deblocking filter, Sample Adaptive Offset (SAO) filter, Adaptive Loop Filter (ALF), diffusion filter, bilateral filter.

In some examples, whether and/or how to filter samples depends on whether these samples are located at the boundary of one block generated by NPT-T splitting.

In some examples, samples of preceding reconstructed child blocks are used in diffusion filter or/and bilateral filter.

In some examples, whether and/or how to filter samples depend on whether these samples are located at the boundary of one transform block within a coding unit generated by NPT-T splitting.

In some examples, intra prediction mode or Combined inter and intra prediction (CIIP) mode depends on the NPT-T partitions.

In some examples, a child block uses preceding reconstructed child blocks for intra prediction in the intra prediction mode or CIIP mode.

In some examples, local illumination compensation (LIC) mode depends on the NPT-T partitions.

In some examples, a child block uses preceding reconstructed child blocks for deriving the LIC parameters.

In some examples, determining whether a use of non-power-of-two partition trees (NPT-T) is enabled based on additional information, where the additional information on whether to apply NPT-T and/or which kind NPT-T is applied is signaled from encoder to decoder.

In some examples, the information is signaled in at least one of video parameter set (VPS), sequence parameter set (SPS), picture parameter set (PPS), sequence header, picture header, slice header, tile group header, tile header, to indicate whether NPT-T can be applied.

In some examples, the information is signaled in at least one of video parameter set (VPS), sequence parameter set (SPS), picture parameter set (PPS), sequence header, picture header, slice header, tile group header, tile header, to indicate which kinds of NPT-T can be applied.

In some examples, the information is signaled in a block to indicate whether NPT-T can be applied.

In some examples, the information is signaled in a block to indicate which kinds of NPT-T can be applied.

In some examples, different NPT-T sets are designed for different block shapes and/or sizes.

In some examples, different NPT-T sets are designed for at least one of pictures, tiles, slices with different temporal layers.

In some examples, whether and/or how to apply NPT-T depend on at least one of the video resolution, picture resolution, coded modes, video characteristics including screen content or camera captured sequence or mixed content, slice type, picture type, tile group type, low delay check flag.

In some examples, one syntax element is signaled to indicate no split or partition.

In some examples, one syntax element is firstly signaled to indicate whether to split or not; and then another syntax element is signaled to indicate the partition including partition tree type and split directions.

In some examples, indication of partition is represented by two syntax elements: selected partition tree type and splitting direction.

In some examples, an index of partition tree type is firstly signaled in a block to indicate whether a block is split by QT, or NPT-T or non-split.

In some examples, the splitting direction including one of horizontal, vertical, mixed direction and/or splitting patterns are further signalled.

In some examples, an index of partition tree type is firstly signaled in a block to indicate whether a block is split by BT, or TT, or NPT-T.

In some examples, the index is conditionally signaled only when at least one of BT, TT and NPT-T is valid for the first block.

In some examples, the splitting direction including one of horizontal, vertical direction and/or splitting patterns are further signaled.

In some examples, an indication of splitting direction is firstly signaled and then followed by partition tree type including QT, TT, NPT-T.

In some examples, a flag is signaled in a block to indicate whether a block is vertical split or horizontal split, where the vertical split is BT vertical split, TT vertical split or NPT-T vertical split, and the horizontal split is BT horizontal split, TT horizontal split or NPT-T horizontal split.

In some examples, the flag is conditionally signaled only when the first block is split by BT, or TT, or NPT-T.

In some examples, the flag is conditionally signaled only when both vertical split and horizontal split are valid for the first block.

In some examples, if only vertical split is valid, the flag is not signaled, and horizontal split is inferred to be used.

In some examples, if only horizontal split is valid, the flag is not signaled, and vertical split is inferred to be used.

In some examples, a binarized code is signaled in a block to indicate which kind of split is used, the split being selected from group of BT, TT, and a kind of NPT-T.

In some examples, the candidates BT, TT or NPT-T to be signaled are all vertical splits or horizontal splits depending on previously signaled or derived information.

In some examples, a first flag is signaled to indicate whether NPT-T is used.

In some examples, the binarized code is binarized as a truncated unary code.

In some examples, a first flag is signaled to indicate whether BT is used, if BT is not used, then a second flag is signaled to indicate whether NPT-T is used, and if NPT-T is used, a third flag indicating which kind of NPT-T is used is further signaled.

In some examples, how to signal which kind of partitions is used in a block depends on which kinds of partitions are valid for the block, the partitions including partition tree type and/or partition directions.

In some examples, the candidate BT, TT or NPT-Ts to be signaled are all vertical splits or horizontal splits depending on previously signaled or derived information.

In some examples, the non-allowed or invalid split cannot be signaled from the encoder to the decoder.

In some examples, if there is only one kind of split from group of BT, TT and NPT-Ts is valid, a binarized code to indicate which kind of split is used is not signaled.

In some examples, if there are only two kinds of split from BT, TT and NPT-Ts are valid, a flag is signaled to indicate which one of the two valid splits is used.

In some examples, a code to indicate which kind of split from group of BT, TT, and NPT-Ts is binarized as a truncated unary code.

In some examples, he maximum value of the truncated unary code is N−1, where N is the number of valid splits from group of BT, TT and NPT-Ts.

In some examples, the invalid split is skipped when building a codeword table.

In some examples, if no NPT-T is valid, the flag indicating whether NPT-T is used is not signaled and inferred to be false.

In some examples, if only one kind of NPT-T is valid and NPT-T is signaled to be used, no further information is signaled to indicate which NPT-T is used, and the valid NPT-T is used implicitly.

In some examples, if only two kinds of NPT-T are valid and NPT-T is signaled to be used, a flag is signaled to indicate which NPT-T is used.

In some examples, if only three kinds of NPT-T are valid and NPT-T is signaled to be used, a message is signaled to indicate which NPT-T is used.

In some examples, the binarization and/or signaling method is not changed according to which kinds of split is valid in the block.

In some examples, indications of partition are coded by arithmetic coding with one or multiple contexts.

In some examples, only partial bins of a bin string are coded with contexts and remaining bins are coded with bypass mode.

In some examples, all bins of a bin string are coded with contexts.

In some examples, all bins of a bin string are coded with bypass mode.

In some examples, for a bin coded with context, one or multiple contexts are used.

In some examples, the context depends on at least one of the following:
(a) the position or index of the bin;
(b) the partitioning of spatial/temporal neighbouring blocks;
(c) the current partition depth including at least one of QT depth, BT depth, TT depth, NPT-T depth and MTT depth of current block;
(d) the partition depth including at least one of QT depth, BT depth, TT depth, NPT-T depth and MTT depth of spatial/temporal neighbouring blocks and/or spatial/temporal non-adjacent blocks;
(e) the coding modes of spatial/temporal neighbouring blocks;
(f) the width/height of spatial/temporal neighbouring blocks;
(g) the width/height of the current block;
(h) slice types/picture types/tile group type;
(i) color component;
(j) statistical results of partition types from previously coded blocks.

In some examples, whether and/or how to apply NPT-T depend on color format and/or color components.

In some examples, the color format includes 4:4:4 or 4:2:0.

In some examples, whether and how to use NPT-T depends on whether luma and chroma coding trees are separated.

In some examples, NPT-T can only be applied on luma component when luma and chroma coding trees are separated.

In some examples, the multiple child blocks include 6, 7, or 8 child blocks.

In some examples, the width of a transform matrix applied to the at least one child block whose width and/or height having a dimension that is a non-power-of-two integer is smaller than the width of the child block; and/or the height of the transform matrix applied to the at least one child block whose width and/or height having a dimension that is a non-power-of-two integer is smaller than the height of the child block.

In some examples, the conversion generates the first block of video from the bitstream representation.

In some examples, the conversion generates the bitstream representation from the first block of video.

Figure 20:
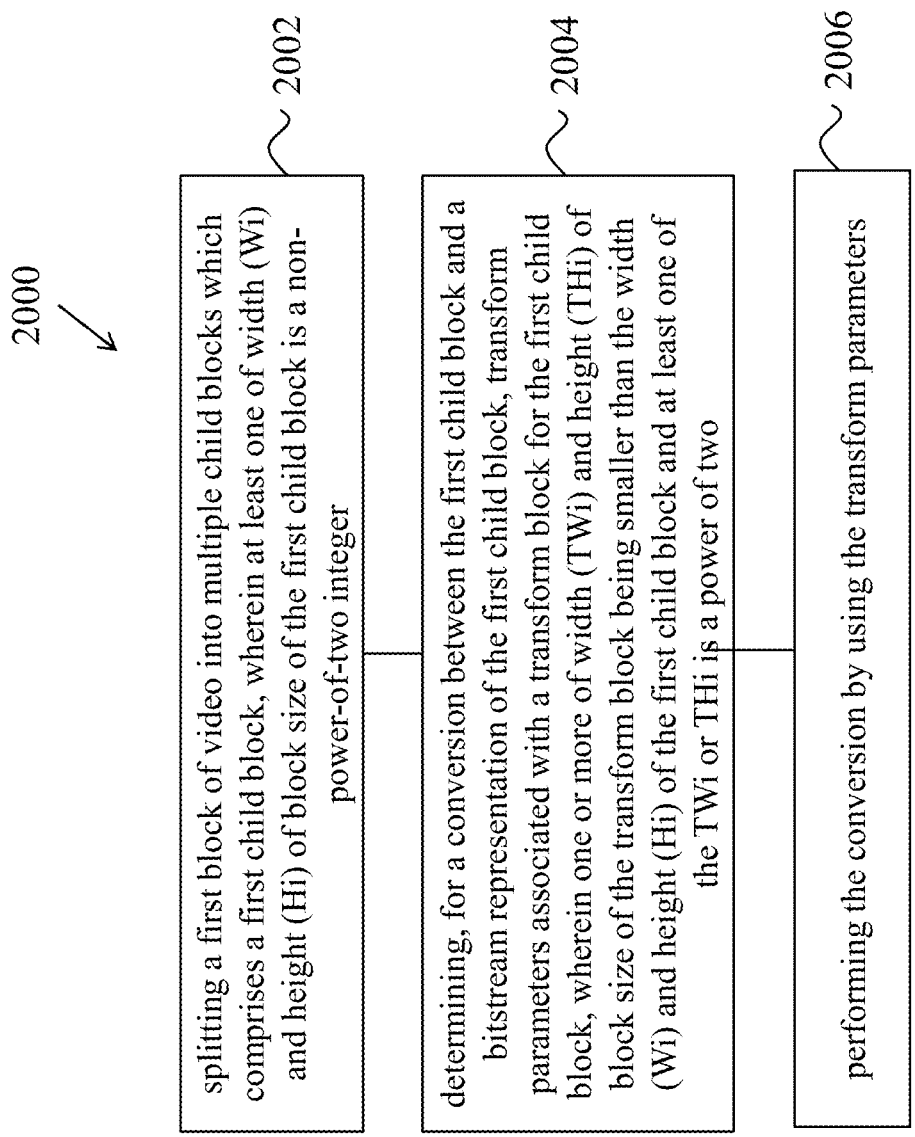
FIG. 20 is a flowchart for an example method of video processing.

FIG. 20 is a flowchart for an example method 2000 of video processing. The method 2000 includes splitting (2002) a first block of video into multiple child blocks which comprises a first child block, wherein at least one of width ($W_i$) and height ($H_i$) of block size of the first child block is a non-power-of-two integer, determining (2004), for a conversion between the first child block and a bitstream representation of the first child block, transform parameters associated with a transform block for the first child block, wherein one or more of width ($TW_i$) and height ($TH_i$) of block size of the transform block being smaller than the width ($W_i$) and height ($H_i$) of the first child block and at least one of the $TW_i$ or $TH_i$ is a power of two; and performing (2006) the conversion by using the transform parameters.

In some examples, the first child block is split from a parent block which is the first block by using non-power-of-two partition trees (NPT-T) partition, wherein the NPT-T partition include splitting the first block of the video into multiple smaller sized first child blocks of the first block, and width (Wi) and/or height (Hi) of at least one first child block is a non-power-of-two integer.

In some examples, the transform parameters include $TW_i$ and/or $TH_i$ and/or transform matrices of the transform block.

In some examples, settings of $TW_i$ and/or $TH_i$ and/or transform matrices of the transform block depend on the block size of the first child block.

In some examples, $TW_i$ is set to pow(2, floor(log 2($W_i$)) and/or $TH_i$ is set to pow(2, floor(log 2($H_i$)), where the function floor (x) returns the greatest integer less than or equal to x, the function pow (x, y) returns y power of x.

In some examples, settings of $TW_i$ and/or $TH_i$ and/or transform matrices of the transform block depend on the available transform matrices.

In some examples, $TW_i$ is set to one allowed transform size and/or transform matrices that is in the form of pow of 2, and/or $TH_i$ is set to one allowed transform size and/or transform matrices that is in the form of pow of 2.

In some examples, $TW_i$ is the maximumly allowed transform size but no larger than $W_i$, and $TH_i$ is the maximumly allowed transform size but no larger than $H_i$.

In some examples, settings of $TW_i$ and/or $TH_i$ and/or transform matrices depend on the parent block wherein the child block is split from.

In some examples, settings of $TW_i$ and/or $TH_i$ and/or transform matrices depend on block sizes of one or more child blocks split from the same parent block.

In some examples, settings of $TW_i$ and/or $TH_i$ and/or transform matrices depend on color format and/or color component.

In some examples, settings of $TW_i$ and/or $TH_i$ and/or transform matrices depend on at least one of picture type, slice type, tile group type, and low delay check flag.

In some examples, settings of $TW_i$ and/or $TH_i$ and/or transform matrices depend on other coded information which includes at least one of quantization parameters, mode information and reference picture information, where the mode information includes intra, inter, combined intra-inter mode, and the reference picture information includes current picture referencing, uni-prediction, bi-prediction and multiple-hypothesis prediction.

In some examples, information on how to define the transform block size and/or transform matricesis is signaled in high level syntax elements including SPS or VPS, or in SPS/PPS/VPS/APS/sequence header/picture header/slice header/tile group header/CTU row/regions.

In some examples, $TW_i$ is no larger than a predefined value TWmax, where TWmax=64, and/or $TH_i$ is no larger than a predefined value THmax, where THmax=64.

In some examples, $TW_i$ is no smaller than a predefined value TWmin, where TWmin=4, and/or $TH_i$ is no smaller than a predefined value THmin, where THmin=4.

In some examples, the transform parameters further include a fixed offset (OffsetX, OffsetY), which is applied to locate a top-left position within a region where transform is to be applied to with the transform parameters, where coordinates of the left-top corner of the first child block is (0, 0).

In some examples, both of OffsetX and OffsetY are set to 0.

In some examples, only one of OffsetX and OffsetY is set to 0.

In some examples, both of OffsetX and OffsetY are unequal to 0.

In some examples, OffsetX and/or OffsetY depend on the shape of the first child block.

In some examples, OffsetX and/or OffsetY depend on the shape of the parent block.

In some examples, OffsetX and/or OffsetY depend on the coded information of the child block/parent block.

In some examples, settings of OffsetX and/or OffsetY depend on color format and/or color component.

In some examples, settings of OffsetX and/or OffsetY depend on at least one of picture type, slice type, tile group type and low delay check flag.

In some examples, settings of OffsetX and/or OffsetY depend on other coded information which includes at least one of quantization parameters, mode information and reference picture information, where the mode information includes intra, inter, combined intra-inter mode, and the reference picture information includes current picture referencing, uni-prediction, bi-prediction and multiple-hypothesis prediction.

In some examples, OffsetX and/or OffsetY are signalled.

In some examples, a candidate set including one or more candidates of OffsetX and/or OffsetY is defined, and index of a candidate is signalled.

In some examples, size of the candidate set depend on the shape of the child block, and index is signaled differently for different shapes of the child block.

In some examples, if size of the candidate set is equal to 1, no index is signaled.

In some examples, a candidate set including one ore more candidates of (OffsetX, OffsetY) is defined, and index of a candidate is signalled to indicate both OffsetX and OffsetY.

In some examples, size of the candidate set depend on the shape of the child block, and index is signaled differently for different shapes of the child block.

In some examples, if size of the candidate set is equal to 1, no index is signaled.

In some examples, the transform parameters include multiple different transform size and/or transform matrices and/or offsets for the first child block.

In some examples, all kinds of the transform sizes are in the form of pow of 2.

In some examples, at least one of the transform sizes is in the form of pow of 2.

In some examples, other kinds of transform sizes are no larger than TWmax and/or THmax.

In some examples, only one fixed offset including both OffsetX and OffsetY that transform region is to be applied is defined or derived for each of allowed transform size.

In some examples, only indications of selected transform sizes are signalled.

In some examples, multiple offsets that transform region is to be applied are associated with each of allowed transform size.

In some examples, indications of selected transform sizes and offset are both signalled.

In some examples, for all kinds of allowed transform sizes, number of allowed offsets are the same.

In some examples, number of allowed offsets is different for different transform size.

In some examples, indications of all kinds of allowed transform sizes and/or offsets and/or transform matrices are signalled.

In some examples, the allowed transform sizes and/or transform matrices and/or offsets are classified into M categories, and category index is firstly signaled.

In some examples, an index to the selected transform size/offsets/matrix is further signalled.

In some examples, one index is signaled to indicate both the transform size and the offset.

In some examples, the conversion generates the first child block of video from the bitstream representation.

In some examples, the conversion generates the bitstream representation from the first child block of video.

Figure 21:
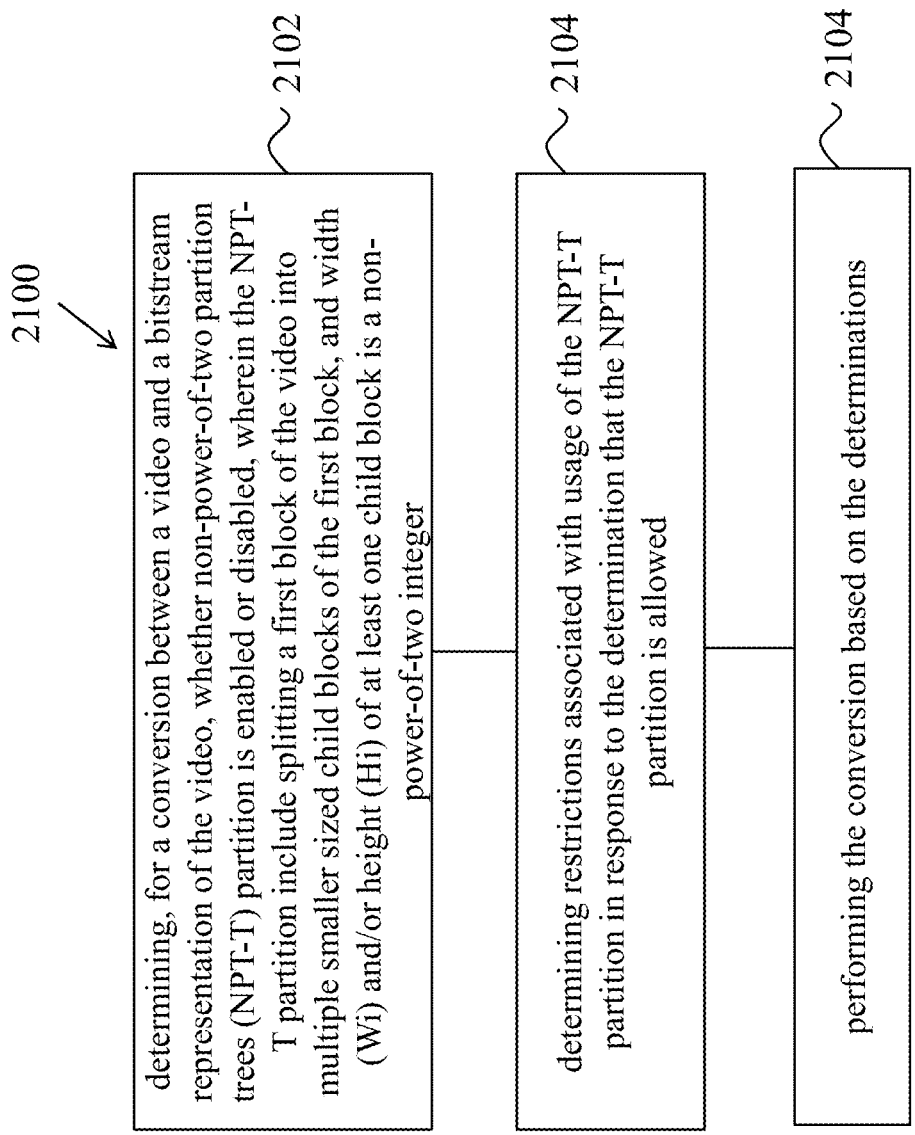
FIG. 21 is a flowchart for an example method of video processing.

FIG. 21 is a flowchart for an example method 1800 of video processing. The method 1800 includes, at 1802, enabling a use of non-power-of-two partition trees (NPT-T) for a conversion between a video and a bitstream representation of the video, wherein the NPT-T includes splitting a video block to one or more smaller sized child blocks of the video block and at least one child block's width or height having a pixel dimension that is a non-power-of-two integer. The method 1800 includes, at 1804, performing the conversion using the NPT-T.

In some examples, the restrictions include maximum and/or minimum block size that allow NPT-T partitions and/or maximum bit depth and/or maximum depth that allow NPT-T partitions.

In some examples, the maximum and/or minimum block size that allow NPT-T partitions and/or the maximum bit depth and/or the maximum depth that allow NPT-T partitions are signalled or parsed in at least one of video parameter set (VPS), sequence parameter set (SPS), picture parameter set (PPS), adaptive parameter set (APS) sequence header, picture header, slice header, tile group header, tile header, coding tree unit (CTU) row and regions.

In some examples, the maximum and/or minimum block size that allow NPT-T partitions and/or the maximum bit depth and/or the maximum depth that allow NPT-T partitions are derived from other values including at least one of depth for multiple type trees (MTT) partitions or depth of quarter-tree (QT) partitions.

In some examples, the maximum block that allows NPT-T partitions is a largest coding block, which is coding tree block or coding tree unit.

In some examples, the maximum block that allows NPT-T partitions is a virtual pipeline data unit (VPDU).

In some examples, the maximum and/or minimum block size that allow NPT-T partitions and/or the maximum depth that allow NPT-T partitions depend on at least one of profile, level or tier of a standard.

In some examples, the maximum and/or minimum block size that allow NPT-T partitions and/or the maximum depth that allow NPT-T partitions are derived to be the same as those for QT partitions.

In some examples, the maximum and/or minimum block size that allow NPT-T partitions and/or the maximum depth that allow NPT-T partitions depend on at least one of tile group tile, slice type, color component, dual tree being enabled or not.

In some examples, the maximum and/or minimum block size that allow NPT-T partitions and/or the maximum depth that allow NPT-T partitions are different for different NPT-T patterns.

In some examples, when the first block is split according to NPT-T partitions, the corresponding depth of NPT-T partitions of one child block is adjusted accordingly.

In some examples, when the first block is split according to NPT-T partitions, the corresponding depth of QT partitions of one child block is adjusted accordingly.

In some examples, when the first block is split according to NPT-T partitions, the corresponding depth of MTT partitions of one child block is adjusted accordingly.

In some examples, the adjustment of corresponding depth of different child blocks are done in the same way.

In some examples, the adjustment of corresponding depth of different child blocks are done in different way.

In some examples, the adjustment is dependent on block dimensions of the child blocks.

In some examples, the adjustment includes increasing the corresponding depth by 1.

In some examples, if a split child block crosses more than one Virtual pipeline data units (VPDUs), the NPT-T partition is disabled.

In some examples, when the child block is forced to be further split until no child block crosses more than one VPDU, the NPT-T partition is enabled.

In some examples, if the width (W) and/or height (H) of the first block satisfy predetermined conditions, the NPT-T partition is disabled.

In some examples, the predetermined conditions include at least one of the following:
the NPT-T partition is disabled if W>=T1 and H>=T2, where T1 and T2 are integers; or
the NPT-T partition is disabled if W>=T1 or H>=T2, where T1 and T2 are integers; or
the NPT-T partition is disabled if W<=T1 and H<=T2, where T1 and T2 are integers; or
the NPT-T partition is disabled if W<=T1 or H<=T2, where T1 and T2 are integers; or
the NPT-T partition is disabled if W×H<=T, where T is an integer; or
the NPT-T partition is disabled if W×H>=T, where T is an integer; or
horizontal NPT-T partition is disabled if H<=T, where T=16; or
horizontal NPT-T is disabled if H>=T, where T=128; or
vertical NPT-T is disabled if W<=T, where T=16; or
vertical NPT-T is disabled if W>=T, where T=128.

In some examples, T1, T2 and T are signaled or parsed in at least one of VPS, SPS, PPS, picture header, slice header, tile group header and tile header.

In some examples, T1, T2 and T depend on color components.

In some examples, T1, T2 and T are different for luma and chroma components.

In some examples, T1, T2 and T depend on whether luma coding tree and chroma coding tree are separated.

In some examples, T1, T2 and T are different for luma and chroma components if the luma coding tree and the chroma coding tree are separated.

In some examples, when the transform is not supported for at least one child block split by the NPT-T partition, the NPT-T partition is disabled.

In some examples, when the depth of the first block exceeds the allowed depth for the NPT-T partition, the NPT-T partition is disabled.

In some examples, when one of the multiple child blocks' size is smaller than the allowed block size, the NPT-T partition is disabled.

In some examples, if the width (W) and/or height (H) of the first block satisfy predetermined conditions, the NPT-T partition is enabled.

In some examples, the predetermined conditions include at least one of the following:
the NPT-T partition is enabled if W>=T1 and H>=T2, where T1 and T2 are integers; or
the NPT-T partition is enabled if W>=T1 or H>=T2, where T1 and T2 are integers; or
the NPT-T partition is enabled if W<=T1 and H<=T2, where T1 and T2 are integers; or
the NPT-T partition is enabled if W<=T1 or H<=T2, where T1 and T2 are integers; or
the NPT-T partition is enabled if W×H<=T, where T is an integer; or
the NPT-T partition is enabled if W×H>=T, where T is an integer; or
horizontal NPT-T partition is enabled if H<=T, where T=64; or
horizontal NPT-T is enabled if H>=T, where T=32; or
vertical NPT-T is enabled if W<=T, where T=64; or
vertical NPT-T is enabled if W>=T, where T=32.

In some examples, T1, T2 and T are signaled or parsed in at least one of VPS, SPS, PPS, picture header, slice header, tile group header and tile header.

In some examples, T1, T2 and T depend on color components.

In some examples, T1, T2 and T are different for luma and chroma components.

In some examples, T1, T2 and T depend on whether luma coding tree and chroma coding tree are separated.

In some examples, T1, T2 and T are different for luma and chroma components if the luma coding tree and the chroma coding tree are separated.

In some examples, if the depth of the first block satisfies predetermined conditions, the NPT-T partition is disabled.

In some examples, the depth of the first block includes at least one of QT depth, BT depth, TT depth, NPT-T depth or MTT depth.

In some examples, the predetermined conditions include at least one of the following:
the NPT-T partition is disabled if the split depth<=T;
the NPT-T partition is disabled if the split depth>=T;
the NPT-T partition is disabled if the QT split depth<=T;
the NPT-T partition is disabled if the QT split depth>=T;
the NPT-T partition is disabled if the BT split depth>=T;
the NPT-T partition is disabled if the BT split depth<=T;
the NPT-T partition is disabled if the TT split depth>=T;
the NPT-T partition is disabled if the TT split depth>=T;
the NPT-T partition is disabled if the NPT-T split depth<=T;
the NPT-T partition T is disabled if the NPT-T split depth>=T;
the NPT-T partition is disabled if the MTT split depth<=T;
the NPT-T partition is disabled if the MTT split depth>=T, where the T is an integer.

In some examples, T is signaled or parsed in at least one of VPS, SPS, PPS, picture header, slice header, tile group header and tile header.

In some examples, T depends on color components.

In some examples, T is different for luma and chroma components.

In some examples, T depends on whether luma coding tree and chroma coding tree are separated.

In some examples, T is different for luma and chroma components if the luma coding tree and the chroma coding tree are separated.

In some examples, if the depth of the first block satisfies predetermined conditions, the NPT-T partition is enabled.

In some examples, the depth of the first block includes at least one of QT depth, BT depth, TT depth, NPT-T depth or MTT depth.

In some examples, the predetermined conditions include at least one of the following:
 the NPT-T partition is enabled if the split depth<=T;
 the NPT-T partition is enabled if the split depth>=T;
 the NPT-T partition is enabled if the QT split depth<=T;
 the NPT-T partition is enabled if the QT split depth>=T;
 the NPT-T partition is enabled if the BT split depth>=T;
 the NPT-T partition is enabled if the BT split depth<=T;
 the NPT-T partition is enabled if the TT split depth>=T;
 the NPT-T partition is enabled if the TT split depth>=T;
 the NPT-T partition is enabled if the NPT-T split depth<=T;
 the NPT-T partition T is enabled if the NPT-T split depth>=T;
 the NPT-T partition is enabled if the MTT split depth<=T;
 the NPT-T partition is enabled if the MTT split depth>=T,
 where the T is an integer.

In some examples, T is signaled or parsed in at least one of VPS, SPS, PPS, picture header, slice header, tile group header and tile header.

In some examples, T depends on color components.

In some examples, T is different for luma and chroma components.

In some examples, T depends on whether luma coding tree and chroma coding tree are separated.

In some examples, T is different for luma and chroma components if the luma coding tree and the chroma coding tree are separated.

In some examples, whether and/or how to use NPT-T partition depends on the position of the first block.

In some examples, whether and how to use the NPT-T partition depend on whether the first block crosses the picture, or tile, or tile group border or not.

In some examples, vertical NPT-T partition is disabled if the first block crosses the picture, or tile, or tile group bottom border.

In some examples, horizontal NPT-T partition is disabled if the first block crosses the picture, or tile, or tile group bottom border.

In some examples, vertical NPT-T partition is disabled if the first block crosses the picture, or tile, or tile group right border.

In some examples, horizontal NPT-T partition is disabled if the first block crosses the picture, or tile, or tile group right border.

In some examples, mixed NPT-T partition is disabled if the first block crosses the picture, or tile, or tile group bottom border.

In some examples, mixed NPT-T partition is disabled if the first block crosses the picture, or tile, or tile group right border.

In some examples, if a child block split by the NPT-T partition is totally out of the picture, or tile, or tile group, the child block is omitted during the conversion.

In some examples, if a child block split by the NPT-T partition is partially out of the picture, or tile, or tile group, the part out of the picture is omitted during the conversion.

In some examples, if a child block split by the NPT-T partition is partially out of the picture, or tile, or tile group, the part inside the picture is further split.

In some examples, if a child block split by the NPT-T partition is partially out of the picture, or tile, or tile group, the part inside the picture is coded as a coding unit (CU).

In some examples, whether the part inside the picture is coded as a CU depends on the width (w) and height (h) of the part.

In some examples, the part inside the picture is coded as a CU if w=2nw, h=2nh, where nw and nh are integers.

In some examples, if any child block split by the NPT-T partition is partially or fully out of the picture or tile or tile group, the NPT-T partition is disabled.

In some examples, when the NPT-T partition or certain NPT-T pattern is disabled, the signaling of indication of the usage of the pattern is skipped.

In some examples, when the NPT-T partition or certain NPT-T pattern is disabled, indication of the usage of the pattern is constrained to be false in a conformance bitstream.

In some examples, the child block split from the first block by the NPT-T is not allowed to be further split with one or more the following splitting methods:
 a. QT,
 b. horizontal BT,
 c. vertical BT,
 d. horizontal TT,
 e. vertical BT,
 f. horizontal Unsymmetrical Quad-Tree (UQT),
 g. vertical UQT, and
 h. NPT-T.

In some examples, the NPT-T partition is disabled for a root node.

In some examples, the NPT-T partition is enabled for a leaf node.

In some examples, signaling of indications of further splits according to other partitions is skipped.

In some examples, the NPT-T partition is only applied to the leaf nodes.

In some examples, a flag is signaled or parsed for the leaf node to indicate whether to use the NPT-T partition or not.

In some examples, indication of which kind NPT-T partition is further signaled or parsed.

In some examples, for certain dimensions of the first block, if the first block is split to the multiple child blocks by the NPT-T partition, all of the multiple child blocks share the same merge list.

In some examples, for certain dimensions of the first block, if the first block is split to the multiple child blocks by the NPT-T partition, all of the multiple child blocks share the same code mode, where the code mode being intra or inter mode.

In some examples, for certain dimensions of the first block, if the first block is split to the multiple child blocks by the NPT-T partition, all of the multiple child blocks share the same Advance Motion Vector Prediction (AMVP) or other kinds of motion candidate lists.

In some examples, for certain dimensions of the first block, if the first block is split to the multiple child blocks by the NPT-T partition, all of the multiple child blocks share the same cross-component linear model (CCLM) or localize illumination compensation (LIC) parameters or other parameters derived at decoder side.

In some examples, the width of a transform matrix applied to the at least one child block whose width and/or height having a dimension that is a non-power-of-two integer is smaller than the width of the child block; and/or the height of the transform matrix applied to the at least one child block whose width and/or height having a dimension that is a non-power-of-two integer is smaller than the height of the child block.

In some examples, the conversion generates the first block of video from the bitstream representation.

In some examples, the conversion generates the bitstream representation from the first block of video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
splitting a first block of video into multiple child blocks which comprises a first child block, wherein at least one of a width ($W_i$) or a height ($H_i$) of a block size of the first child block is a non-power-of-two integer;
determining, for a conversion between the first child block and a bitstream representation of the first child block, transform parameters associated with a transform block for the first child block, wherein one or more of a width ($TW_i$) and a height ($TH_i$) of a block size of the transform block being smaller than the width ($W_i$) and height ($TH_i$) of the first child block and at least one of the width ($TW_i$) or the height ($TH_i$) is a power of two, and wherein settings of $TW_i$ and/or $TH_i$ and/or transform matrices of the transform block depend on the block size of the first child block or available transform matrices, and wherein $TW_i$ is set to pow(2, floor(log 2($W_i$)) and/or $TH_i$ is set to pow(2, floor(log 2($H_i$)), where floor (x) is a function that returns a greatest integer less than or equal to x, and where pow (x, y) is a function that returns y power of x; and performing the conversion by using the transform parameters, wherein the transform parameters include a fixed offset (OffsetX, OffsetY), which is applied to locate a top-left position within a region where transform is to be applied to with the transform parameters, where coordinates of a left-top corner of the first child block is (0, 0).

2. The method of claim 1, wherein the first child block is split from a parent block which is the first block by using non-power-of-two partition trees (NPT-T) partition, wherein the NPT-T partition include splitting the first block of the video into multiple smaller sized first child blocks of the first block.

3. The method of claim 1, wherein $TW_i$ is set to one allowed transform size and/or transform matrices that is in a form of power of 2, and/or $TH_i$ is set to one allowed transform size and/or transform matrices that is in the form of power of 2, and wherein $TW_i$ is a maximum allowed transform size but no larger than $W_i$, and $TH_i$ is a maximum allowed transform size but no larger than $H_i$.

4. The method of claim 1, wherein settings of $TW_i$ and/or $TH_i$ and/or transform matrices depend on a parent block from which a child block is split, or block sizes of one or more child blocks split from the parent block, or color format and/or color component, or at least one of a picture type, a slice type, a tile group type, and a low delay check flag, or other coded information which includes at least one of quantization parameters, mode information, and reference picture information, wherein the mode information includes intra, inter, combined intra-inter mode, and wherein the reference picture information includes current picture referencing, uni-prediction, bi-prediction, and multiple-hypothesis prediction.

5. The method of claim 1, wherein $TW_i$ is no larger than a predefined value TWmax, where TWmax=64, and/or $TH_i$ is no larger than a predefined value THmax, where THmax=64, or $TW_i$ is no smaller than a predefined value TWmin, where TWmin=4, and/or $TH_i$ is no smaller than a predefined value THmin, where THmin=4.

6. The method of claim 1, wherein both of OffsetX and OffsetY are set to 0, or only one of OffsetX and OffsetY is set to 0, or both of OffsetX and OffsetY are unequal to 0.

7. The method of claim 1, wherein OffsetX and/or OffsetY depend on a shape of the first child block, or the shape of a parent block, or coded information of the first child block or the parent block.

8. The method of claim 1, wherein settings of OffsetX and/or OffsetY depend on color format and/or color component, or at least one of picture type, slice type, tile group type and low delay check flag, or other coded information which includes at least one of quantization parameters, mode information and reference picture information, where the mode information includes intra, inter, combined intra-inter mode, and the reference picture information includes current picture referencing, uni-prediction, bi-prediction and multiple-hypothesis prediction.

9. The method of claim 1, wherein OffsetX and/or OffsetY are signalled.

10. The method of claim 1, wherein a candidate set including one or more candidates of OffsetX and/or OffsetY is defined, and index of a candidate is signalled.

11. The method of claim 10, wherein size of the candidate set depend on a shape of the first child block, and index is signaled differently for different shapes of the first child block, and if size of the candidate set is equal to 1, no index is signaled.

12. The method of claim 1, wherein a candidate set including one or more candidates of (OffsetX, OffsetY) is defined, and index of a candidate is signalled to indicate both OffsetX and OffsetY.

13. The method of claim 12, wherein a size of the candidate set depends on a shape of a child block, wherein an index is signaled differently for different shapes of the child block, and wherein, in case the size of the candidate set is equal to 1, no index is signaled.

14. The method of claim 1, wherein the transform parameters include multiple different transform size and/or transform matrices and/or offsets for the first child block.

15. The method of claim 1, wherein the conversion generates the first child block of the video from the bitstream representation.

16. The method of claim 1, wherein the conversion generates the bitstream representation from the first child block of the video.

17. A video processing apparatus comprising a processor and a non-transitory memory with instructions thereon, wherein the instructions upon execution by the processor, cause the processor to:

split a first block of video into multiple child blocks which comprises a first child block, wherein at least one of a width ($W_i$) or a height ($H_i$) of a block size of the first child block is a non-power-of-two integer;

determine, for a conversion between the first child block and a bitstream representation of the first child block, transform parameters associated with a transform block for the first child block, wherein one or more of a width ($TW_i$) and a height ($TH_i$) of a block size of the transform block being smaller than the width ($W_i$) and the height ($H_i$) of the first child block and at least one of the width ($TW_i$) or the height ($TH_i$) is a power of two, and wherein settings of $TW_i$ and/or $TH_i$ and/or transform matrices of the transform block depend on the block size of the first child block or available transform matrices, and wherein $TW_i$ is set to pow(2, floor(log 2($W_i$)) and/or $TH_i$ is set to pow(2, floor(log 2($H_i$)), where floor (x) is a function that returns a greatest integer less than or equal to x, and where pow (x, y) is a function that returns y power of x; and perform the conversion by using the transform parameters, wherein the transform parameters include a fixed offset (OffsetX, OffsetY), which is applied to locate a top-left position within a region where transform is to be applied to with the transform parameters, where coordinates of a left-top corner of the first child block is (0, 0).

18. A non-transitory computer readable recording media storing a bitstream of a video which is generated by a method performed by a video processing apparatus, wherein the method comprises:

splitting a first block of video into multiple child blocks which comprises a first child block, wherein at least one of a width ($W_i$) or a height ($H_i$) of a block size of the first child block is a non-power-of-two integer;

determining transform parameters associated with a transform block for the first child block, wherein one or more of a width ($TW_i$) and a height ($TH_i$) of a block size of the transform block being smaller than the width ($W_i$) and the height ($H_i$) of the first child block and at least one of the width ($TW_i$) or the height ($TH_i$) is a power of two, and wherein settings of $TW_i$ and/or $TH_i$ and/or transform matrices of the transform block depend on the block size of the first child block or available transform matrices, and wherein $TW_i$ is set to pow(2, floor(log 2($W_i$)) and/or $TH_i$ is set to pow(2, floor(log 2($H_i$)), where floor (x) is a function that returns a greatest integer less than or equal to x, and where pow (x, y) is a function that returns y power of x; and generating the bitstream by using the transform parameters, wherein the transform parameters include a fixed offset (OffsetX, OffsetY), which is applied to locate a top-left position within a region where transform is to be applied to with the transform parameters, where coordinates of a left-top corner of the first child block is (0, 0).

19. The video processing apparatus of claim 17, wherein the first child block is split from a parent block which is the first block by using non-power-of-two partition trees (NPT-T) partition, wherein the NPT-T partition includes splitting the first block of the video into multiple smaller sized first child blocks of the first block.

20. The non-transitory computer readable recording media of claim 18, wherein the first child block is split from a parent block which is the first block by using non-power-of-two partition trees (NPT-T) partition, wherein the NPT-T partition include splitting the first block of the video into multiple smaller sized first child blocks of the first block.

* * * * *